United States Patent
Burd et al.

(10) Patent No.: US 11,492,120 B2
(45) Date of Patent: Nov. 8, 2022

(54) ULTRA LIGHT WEIGHT COMPOSITE AIRCRAFT GALLEY ARCHITECTURE

(71) Applicant: B/E Aerospace, Inc., Winston Salem, NC (US)

(72) Inventors: Peter J. L. Burd, Burry Port (GB); Venkata P. S. Neti, Milton Keynes (GB); Nicholas J. W. Pearce, Mukilteo, WA (US); Hayley L. Campbell, Bedfordshire (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 580 days.

(21) Appl. No.: 16/436,620

(22) Filed: Jun. 10, 2019

(65) Prior Publication Data

US 2020/0385122 A1 Dec. 10, 2020

(51) Int. Cl.
*B64D 11/04* (2006.01)
*B32B 3/12* (2006.01)
*B32B 5/02* (2006.01)
*B32B 5/24* (2006.01)
(Continued)

(52) U.S. Cl.
CPC ............... *B64D 11/04* (2013.01); *B32B 3/12* (2013.01); *B32B 5/02* (2013.01); *B32B 5/245* (2013.01); *B32B 5/26* (2013.01); *B32B 2262/106* (2013.01); *B32B 2605/18* (2013.01); *B64D 2011/0046* (2013.01)

(58) Field of Classification Search
CPC ............ B64D 11/04; B64D 2011/0046; A47B 95/008; A47B 96/02; A47B 47/00; A47B 47/047; A47B 87/00
See application file for complete search history.

(56) References Cited

U.S. PATENT DOCUMENTS 2,580,334 A * 12/1951 Vanderveld ........ A47B 87/0207
312/108
2011/0001009 A1 1/2011 Reece
(Continued)

FOREIGN PATENT DOCUMENTS

WO 2007096000 A1 8/2007

OTHER PUBLICATIONS

Search Report for European Application No. 20178562.3 dated Nov. 4, 2020, 5 pages.

*Primary Examiner* — Richard R. Green
*Assistant Examiner* — Arfan Y. Sinaki
(74) *Attorney, Agent, or Firm* — Suiter Swantz pc llo

(57) ABSTRACT

An ultra light weight aircraft composite galley architecture system and method comprises composite construction of a partially molded aircraft monument structure based on embedded load bearing hoops and beams used in conjunction with pre formed composite flat panel construction. An upper L shaped structural section mates with a lower inverted L shaped structural section forming a structure upon which additional panels are joined to form the complete composite galley. This system and method of construction produces a high strength aircraft monument capable of maintaining aircraft structural flight and crash load requirements without external monument extrusions for support. This galley architecture system and method of construction creates an aircraft monument with desirable reduction in weight with no loss of required structural strength.

17 Claims, 24 Drawing Sheets

(51) Int. Cl.
*B32B 5/26* (2006.01)
*B64D 11/00* (2006.01)

(56) References Cited

U.S. PATENT DOCUMENTS

| | | | |
|---|---|---|---|
| 2012/0085862 A1* | 4/2012 | Pangalila | B64D 11/04 244/118.5 |
| 2013/0256249 A1* | 10/2013 | Burd | B64D 11/0015 211/153 |
| 2014/0152027 A1* | 6/2014 | Burd | E05C 19/009 292/200 |
| 2014/0238064 A1* | 8/2014 | Hawkins | F25D 23/02 62/244 |
| 2015/0059384 A1* | 3/2015 | Burd | B64D 11/04 62/239 |
| 2015/0059385 A1* | 3/2015 | Burd | F25D 15/00 62/239 |
| 2016/0311534 A1* | 10/2016 | Nojiri | B64D 11/04 |
| 2017/0349289 A1* | 12/2017 | Sieben | B64D 13/08 |
| 2018/0072425 A1* | 3/2018 | Weifenbach | B64D 11/04 |
| 2018/0135212 A1* | 5/2018 | Johanson | D03D 15/46 |
| 2019/0002105 A1* | 1/2019 | Moran | B64D 11/0007 |
| 2019/0375508 A1* | 12/2019 | Schalla | B64D 13/08 |
| 2019/0389598 A1* | 12/2019 | Chua | B64C 1/34 |
| 2020/0115057 A1* | 4/2020 | Chylinski | B64D 11/0007 |

* cited by examiner

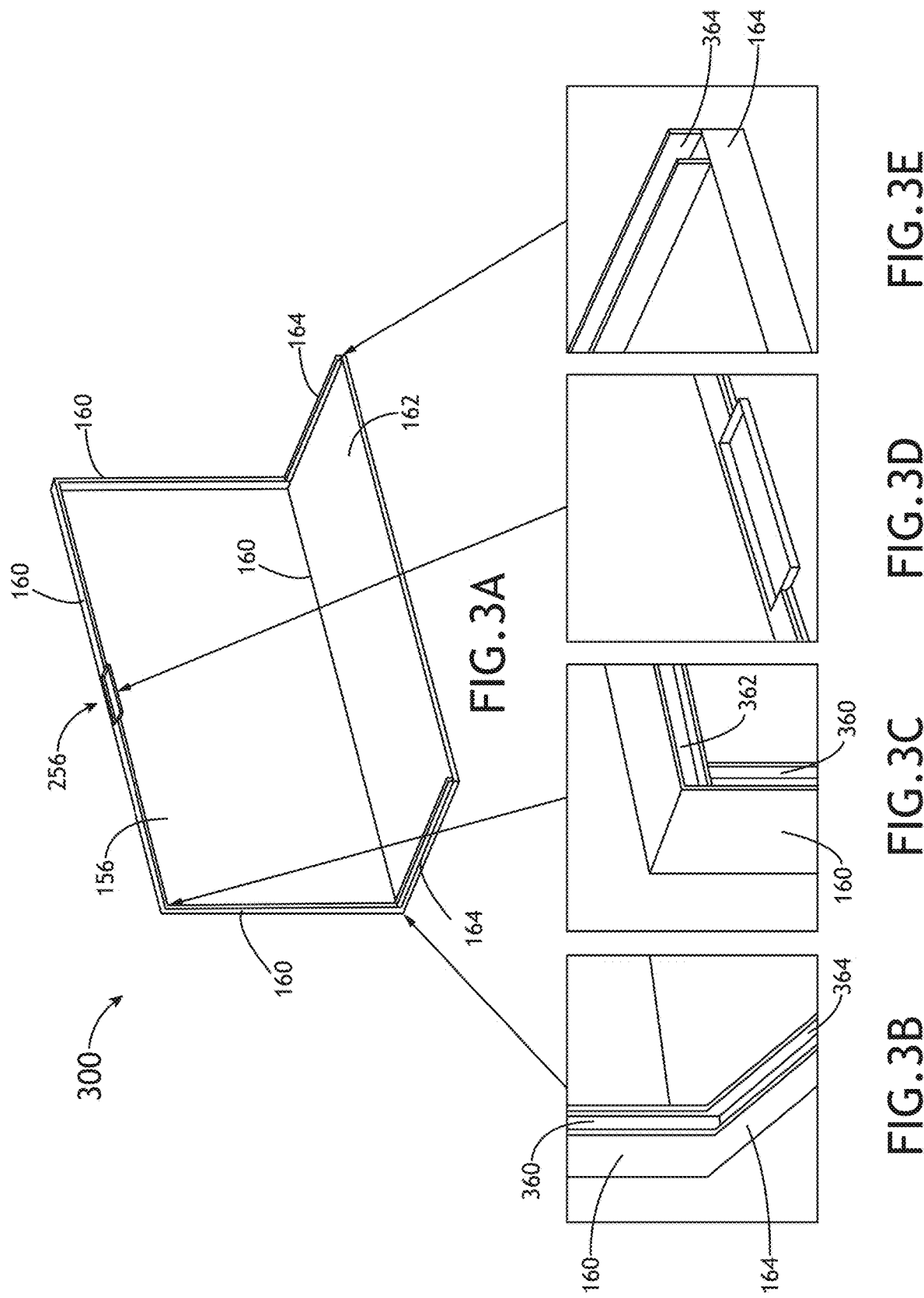

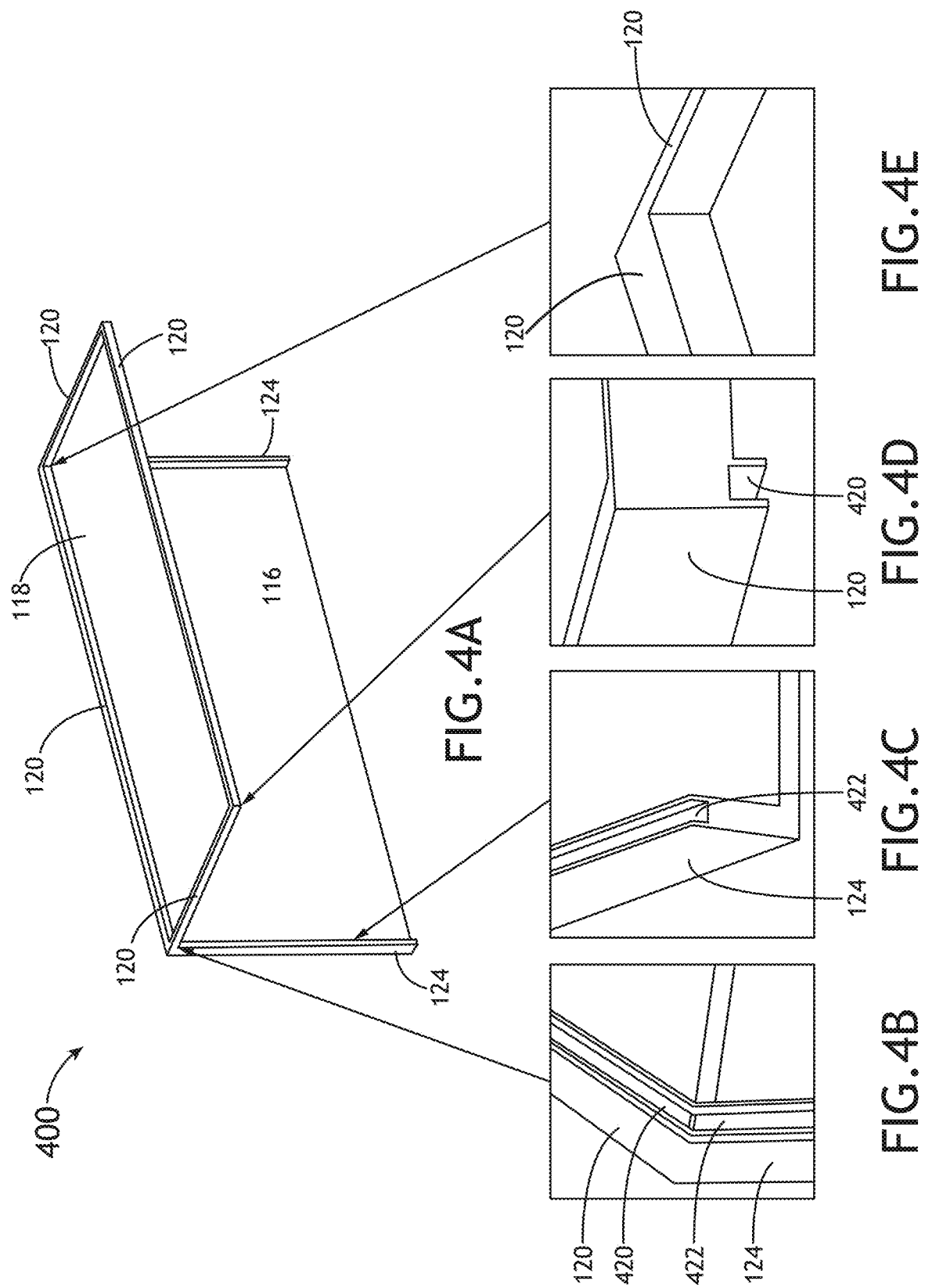

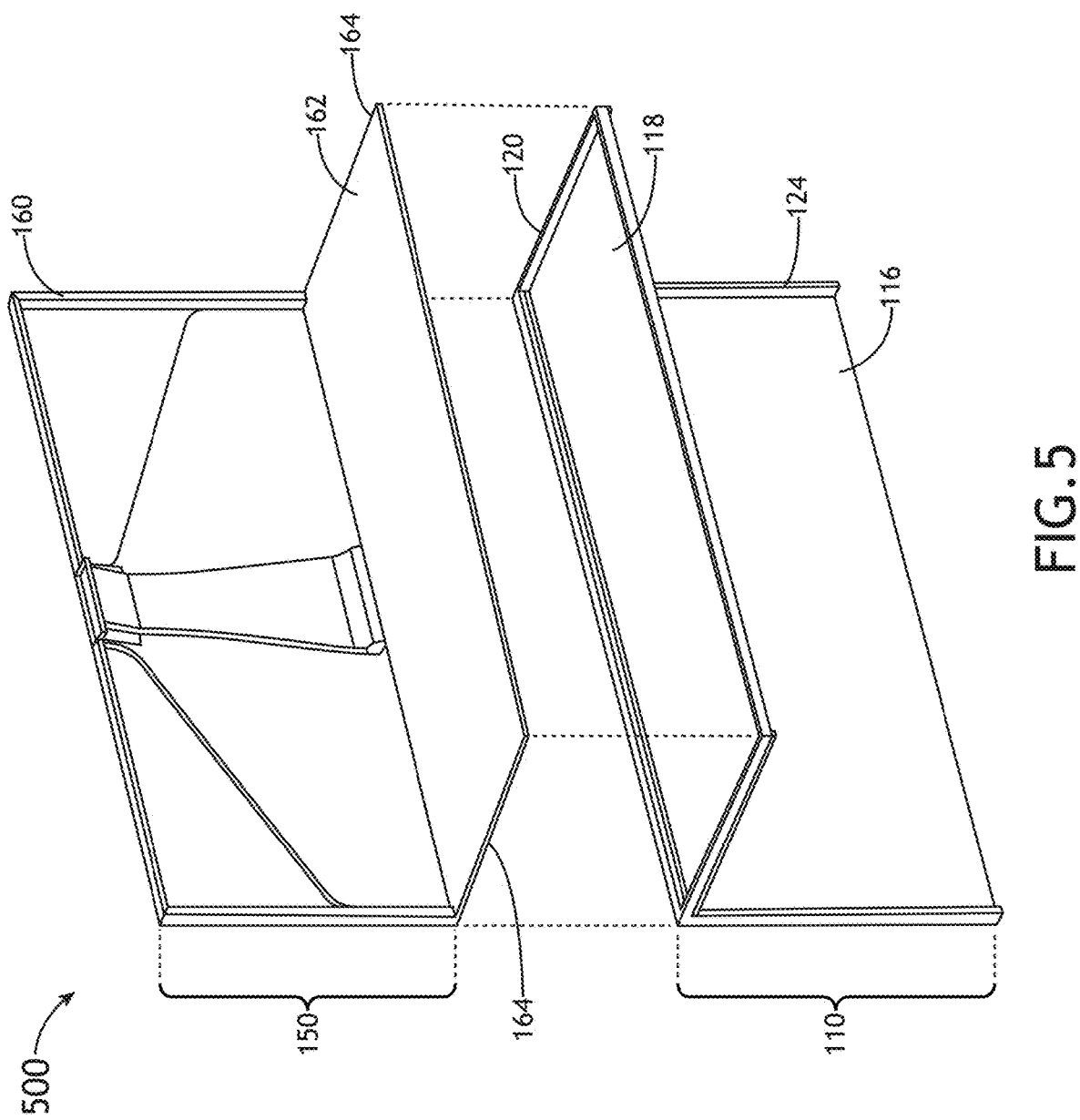

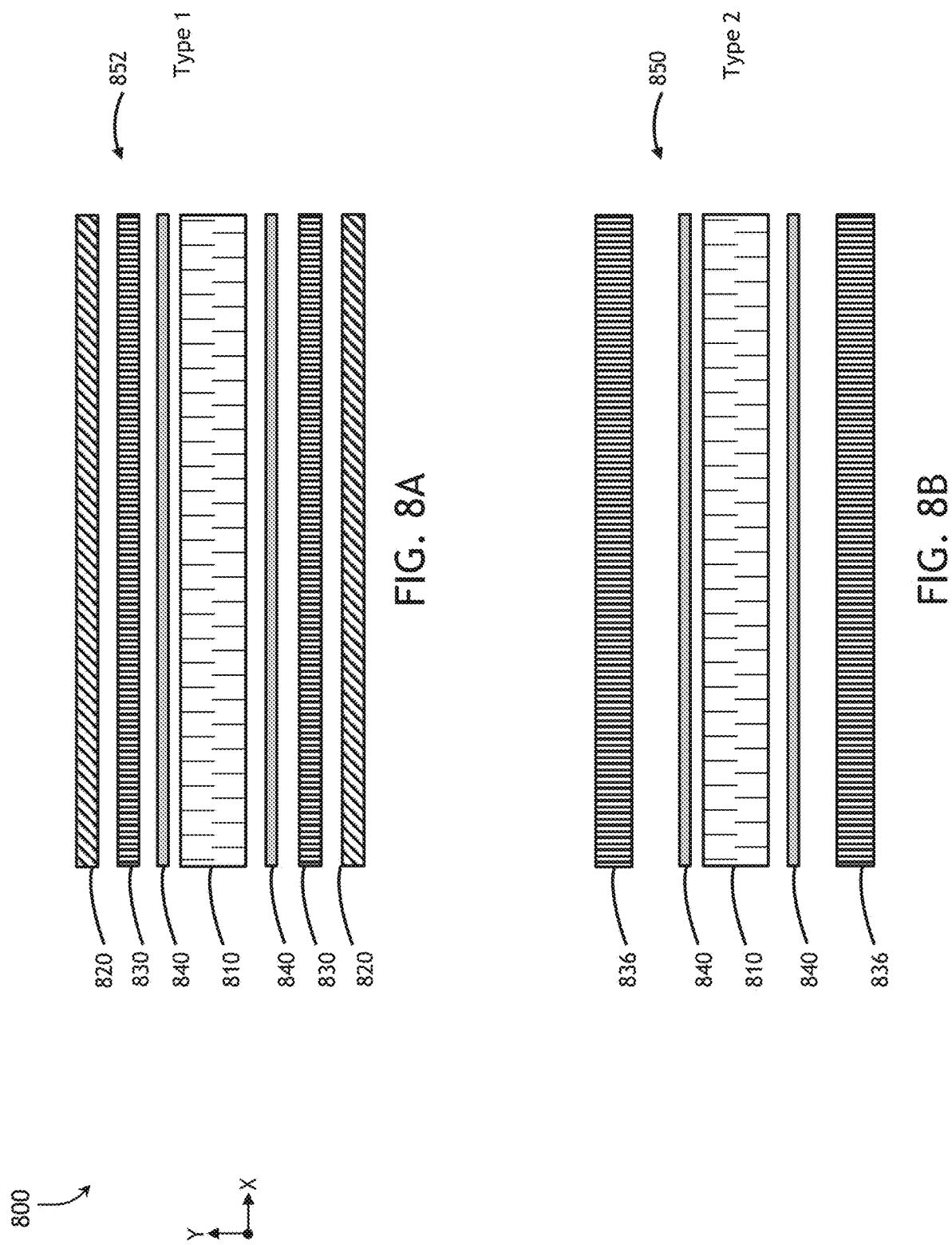

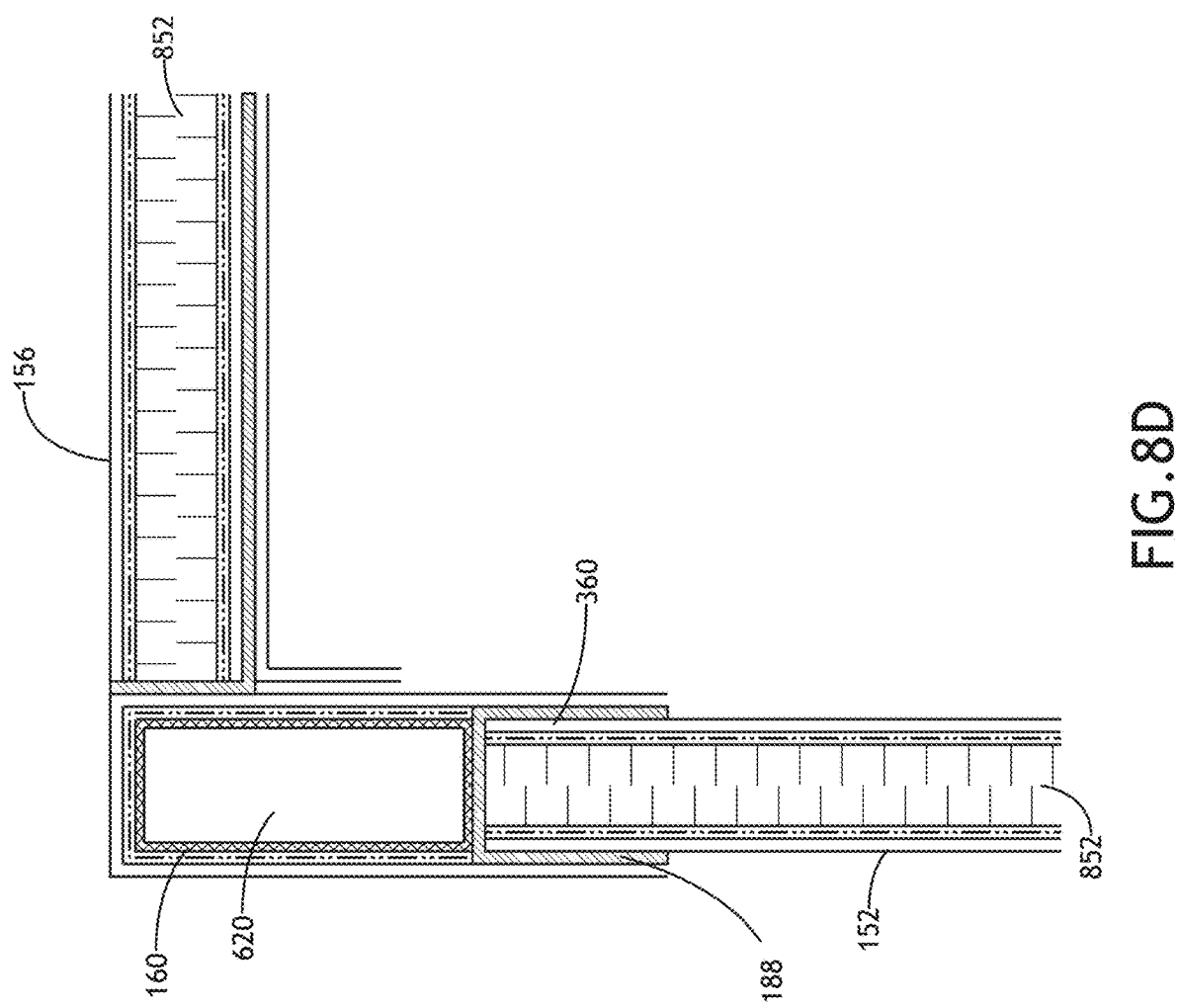

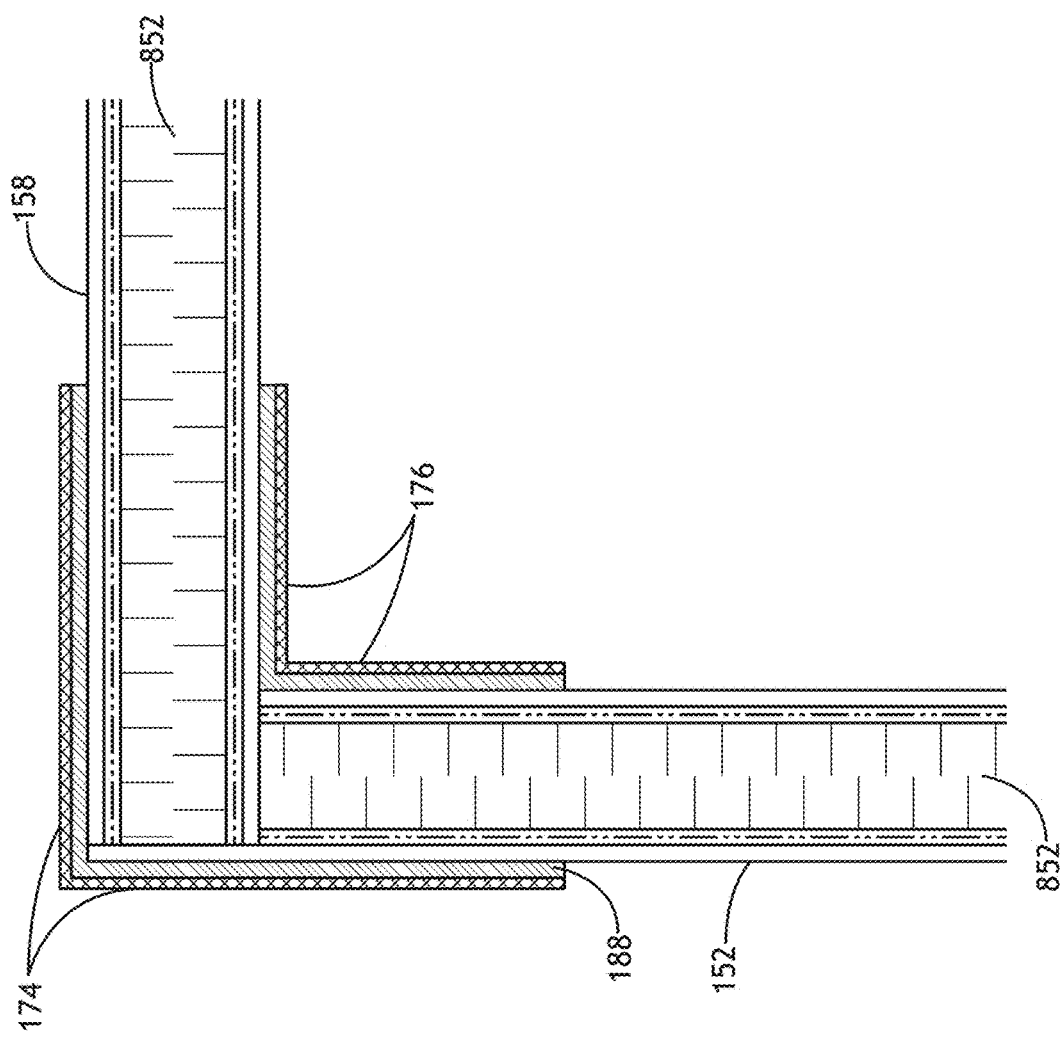

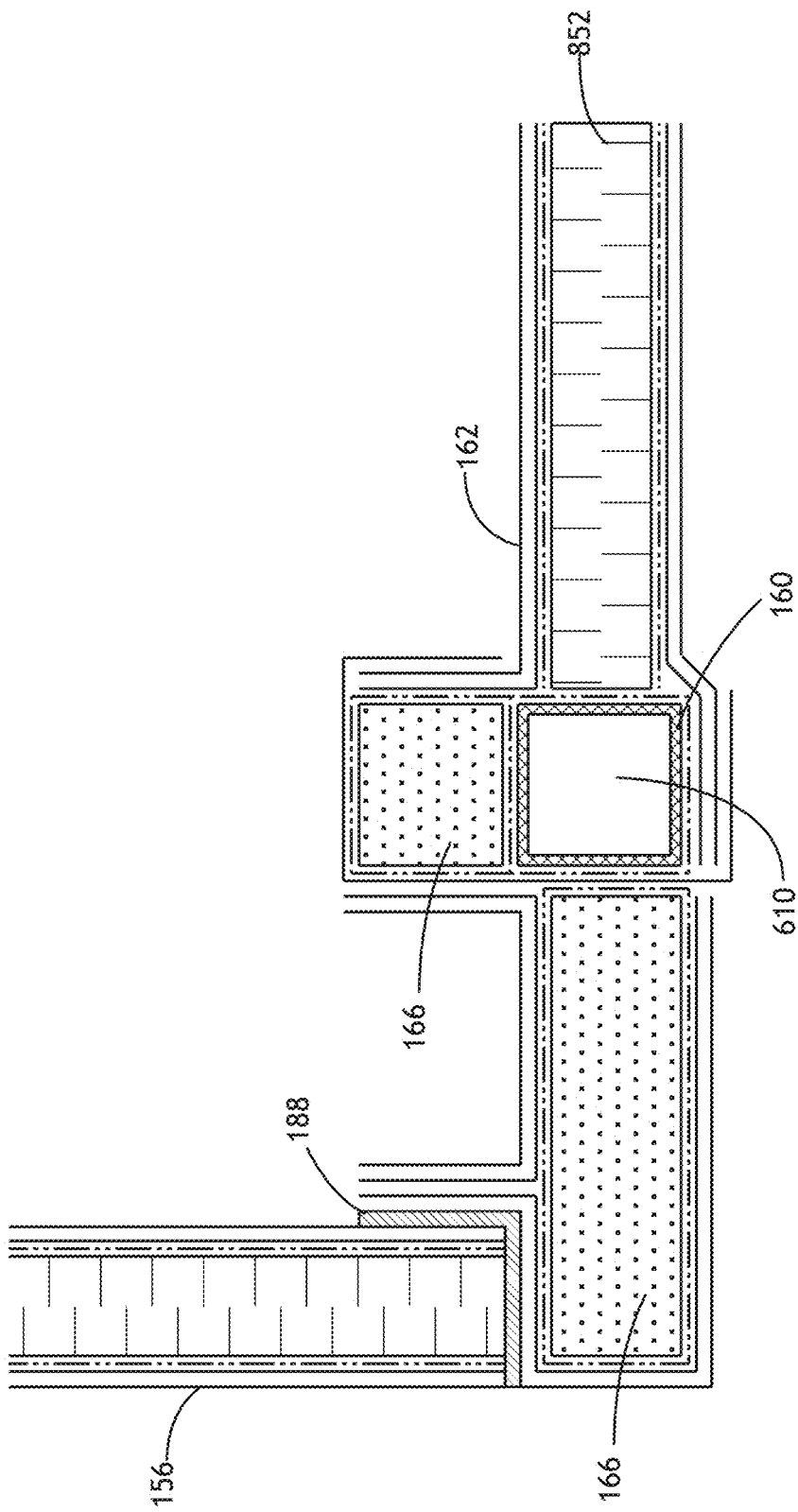

ULTRA LIGHT WEIGHT COMPOSITE AIRCRAFT GALLEY ARCHITECTURE

CROSS-REFERENCE TO RELATED APPLICATIONS

The present application is related to U.S. patent application Ser. No. 16,401,440 filed May 2, 2019), entitled Aircraft Monument Composite Construction Using Carbon Uni-Directional Spread Flat Tow Woven Fabric which is incorporated herein by reference.

BACKGROUND

Traditional aircraft galley designs maintain external components to ensure structural integrity of a galley monument. These metallic extrusions are normally used to assemble the carcass of an aircraft monument but increase overall weight and footprint of the monument.

This additional structure may cause undesirable cold bridges within a chilled compartment as well as problematic galvanic corrosion.

Therefore, a need remains for a galley architecture which may overcome these limitations and provide a novel solution to a composite galley architecture eliminating external corrosion prone metallic extrusions and heavy hardware incorporated within a traditional aircraft galley architecture.

SUMMARY

In one aspect, embodiments of the inventive concepts disclosed herein are directed to a light weight composite aircraft galley architecture. The light weight composite aircraft galley may comprise an upper modular rectangular cuboid including an upper structural section. The upper structural section may comprise two perpendicular upper contiguous elongated panels of the upper modular rectangular cuboid, the two perpendicular upper contiguous elongated panels constructed of a composite panel structure.

The light weight composite aircraft galley may also include a lower modular rectangular cuboid including a lower structural section, the lower structural section comprising two perpendicular lower contiguous elongated panels of the lower modular rectangular cuboid, the two perpendicular lower contiguous elongated panels constructed of the composite panel structure. The light weight composite aircraft galley may be comprised of a lower top panel of the lower structural section configured to join with an upper base panel of the upper structural section.

For structural integrity, the upper structural section and the lower structural section each comprising a load bearing peripheral hoop configured for transferring a flight load and a crash load between the upper modular rectangular cuboid and the lower modular rectangular cuboid without a metallic extrusion, the load bearing peripheral hoop constructed of a series of embedded unidirectional carbon fiber beams and/or box sections surrounding at least one panel of each of the upper structural section and the lower structural section.

Also to stiffen the structure, the upper structural section and the lower structural section each further comprising at least one embedded carbon fiber beam separate from the lower bearing peripheral hoop, the at least one embedded beam configured for maintaining a physical integrity of each of the upper and lower structural sections under the flight load and the crash load without a metallic extrusion.

A further embodiment of the inventive concepts disclosed herein may include a method for lightweight composite aircraft galley construction. The method comprising fabricating a lightweight composite aircraft galley, the lightweight composite aircraft galley comprised of an upper modular rectangular cuboid coupled with a lower modular rectangular cuboid, each cuboid constructed of a composite panel structure. In fabrication, the upper modular rectangular cuboid including an upper structural section comprising two perpendicular upper contiguous elongated panels, the two perpendicular upper contiguous elongated panels constructed of a composite panel structure.

In addition, the lower modular rectangular cuboid may include a lower structural section, the lower structural section comprising two lower perpendicular contiguous elongated panels, the two perpendicular lower contiguous elongated panels constructed of the composite panel structure.

The method may include embedding within each of the upper structural section and the lower structural section at least one load bearing peripheral hoop configured for transferring a flight load and a crash load between the upper modular rectangular cuboid and the lower modular rectangular cuboid without a metallic extrusion, the load bearing peripheral hoop encircles at least one panel of the upper structural section and encircles at least one panel of the lower structural section.

The method may also include embedding within each of the upper structural section and the lower structural section at least one embedded carbon fiber beam separate from the at least one load bearing peripheral hoop, the embedded carbon fiber beam configured for maintaining a physical integrity of each of the upper and lower structural sections under the flight load and the crash load without a metallic extrusion. The method may further include configuring the at least one of the upper modular rectangular cuboid and the lower modular rectangular cuboid to couple with an aircraft cabin.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which:

FIGS. 3A-3E are diagrams of an upper structural section exemplary of an embodiment of the inventive concepts disclosed herein;

FIGS. 4A-4E are diagrams of a lower structural section exemplary of one embodiment of the inventive concepts disclosed herein;

FIG. 5 is a diagram of an assembly view in accordance with one embodiment of the inventive concepts disclosed herein;

DETAILED DESCRIPTION OF EXEMPLARY EMBODIMENTS

Figure 1:
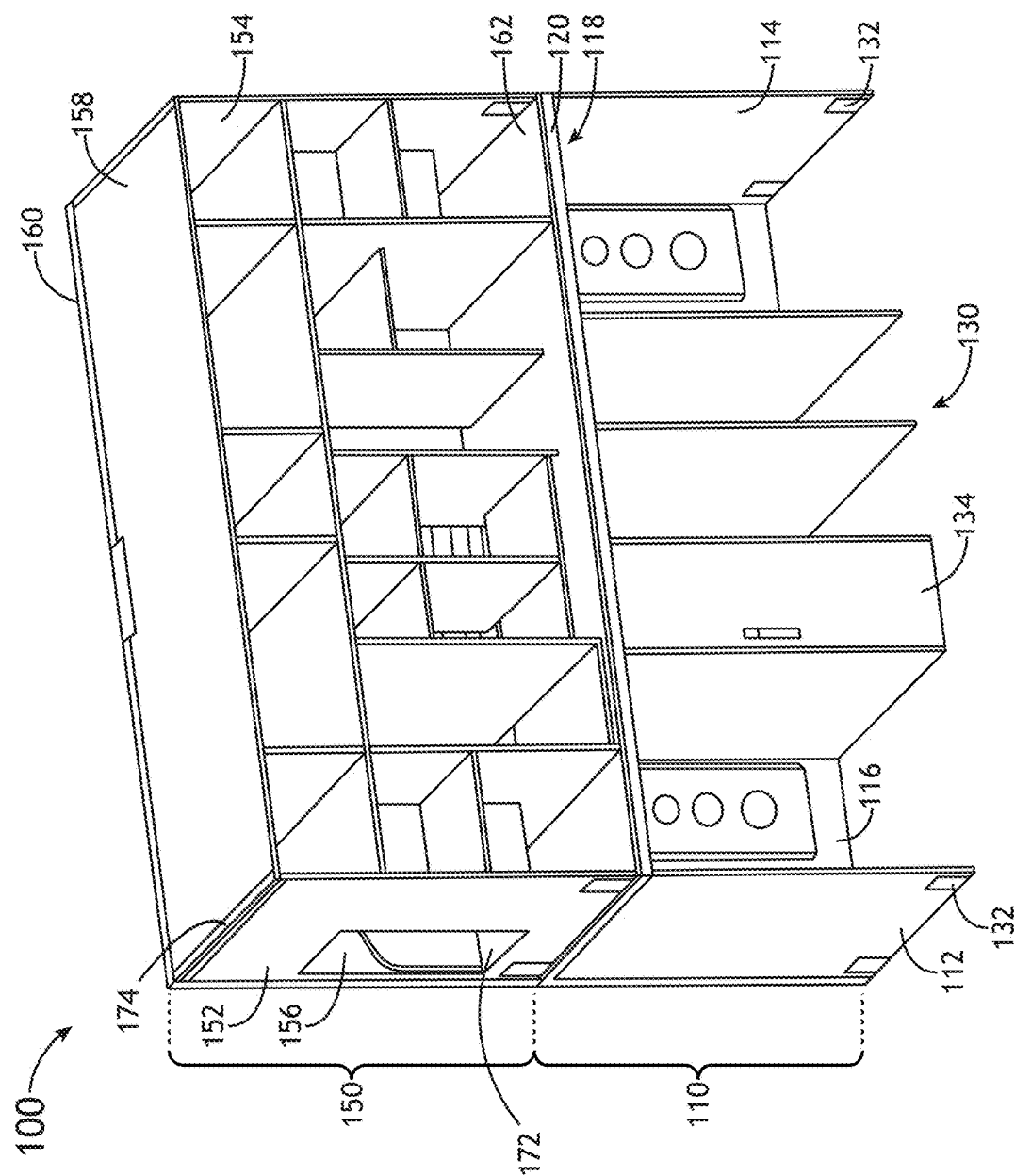
FIG. 1 is a diagram of a lightweight composite galley in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to an ultra light weight aircraft composite galley architecture system and method comprises composite construction of a partially molded aircraft monument structure based on embedded load bearing hoops and beams used in conjunction with pre formed composite flat panel construction. An upper L shaped structural section mates with a lower inverted L shaped structural section forming a structure upon which additional panels are joined to form the complete composite galley. This system and method of construction produces a high strength aircraft monument capable of maintaining aircraft structural flight and crash load requirements without external monument extrusions for support. This galley architecture system and method of construction creates an aircraft monument with desirable reduction in weight with no loss of required structural strength.

REFERENCE CHART

| | |
|---|---|
| 100 | Lightweight Composite Galley |
| 110 | Lower Modular Rectangular Cuboid |
| 112 | Lower Left Side Panel |
| 114 | Lower Right Side Panel |
| 116 | Lower Back Panel |
| 118 | Lower Top Panel |
| 120 | Lower Structural Hoop |
| 124 | Lower Embedded Beam |
| 130 | Lower Cart Dividers |
| 132 | Non-Metallic Attachment Points |
| 134 | Lower Galley Door |
| 150 | Upper Modular Rectangular Cuboid |
| 152 | Upper Left Side Panel |
| 154 | Upper Right Side Panel |
| 156 | Upper Back Panel |
| 158 | Upper Top Panel |
| 160 | Upper Structural Hoop |
| 162 | Upper Base Panel |
| 164 | Upper Embedded Beam |
| 166 | Foam Core |
| 172 | Oven Shelf Panel |
| 174 | External Cured Carbon Fiber Pultrusion |
| 176 | Internal Cured Carbon Fiber Pultrusion |
| 180 | 283 GSM 5 High Strength Carbon |
| 182 | 300 GSM Unidirectional Carbon |
| 184 | 175 GSM 3 High Strength Aramid |
| 186 | 300 GSM Phenolic Glass |
| 188 | Wet Adhesive |
| 200 | Galley Exploded View |
| 210 | Air Supply Duct |
| 220 | Air Return Duct |
| 230 | Siamese Air Port |
| 240 | Siamese Supply Port |
| 242 | Lower Top Air Pathway |
| 250 | Siamese Return Port |
| 252 | Lower Back Air Return Pathway |
| 256 | Air Chiller Interface Port |

-continued

| | |
|---|---|
| 300 | Upper Structural Section |
| 360 | Upper Vertical Channel |
| 362 | Upper Top Channel |
| 364 | Upper Horizontal Channel |
| 400 | Lower Structural Section |
| 420 | Lower Horizontal Channel |
| 422 | Lower Vertical Channel |
| 500 | Assembly View |
| 600 | Assembled Galley View |
| 610 | 100 mm² beam |
| 620 | 500 mm² beam |
| 630 | 320 mm² beam |
| 656 | Upper Close out Panel |
| 700 | Galley Isometric View |
| 800 | Detail Galley Structure View |
| 810 | Inner Core Sheet |
| 820 | 45/45 STF Sheet |
| 830 | 0/90 STF Sheet |
| 836 | Heavy 0/90 STF Sheet |
| 840 | Adhesive Film |
| 850 | Composite Panel Type 2 |
| 852 | Composite Panel Type 1 |
| 858 | Tongue Upper Top Panel |
| 900 | Method for Construction |
| 902 | Fabricating a Lightweight Galley |
| 904 | Coupling the Galley with an Aircraft |

FIG. 1 Architecture

Referring now to FIG. 1, a diagram of a lightweight composite galley in accordance with an embodiment of the inventive concepts disclosed herein is shown. Generally, the lightweight composite galley 100 may include two molded L-shaped structures coupled to form an aircraft galley structure. Compared with a traditional galley monument, the lightweight composite galley 100 may reduce a conventional chilled galley depth by approximately four inches depending on the catering standard being used (e.g., ACE, ATLAS, KSSU, etc.). Within one or more panels of the L shaped structures, the lightweight composite galley 100 may include an embedded chilled air distribution ductwork which may further minimize an overall footprint of the lightweight composite galley 100.

The lightweight composite galley 100 may include a lower modular rectangular cuboid 110 constructed using half of a lower L shaped structure to enclose galley related items. The lower modular rectangular cuboid 110 may be constructed of a lower left side panel 112, a lower right side panel 114, a lower back panel 116, and a lower top panel 118.

In one embodiment of the inventive concepts disclosed herein, for structural integrity, the lower modular rectangular cuboid 110 may include a lower structural section hoop 120 embedded within a periphery of the lower top panel 118. These load bearing peripheral hoops 120 may assist in transferring flight and crash loads between the upper to lower modular rectangular cuboids. In one embodiment, for increased structural performance, the lower structural section hoop 120 may be molded around a periphery of one or all of the panels of the lower modular rectangular cuboid 110.

The lower modular rectangular cuboid 110 may further comprise a series of lower cart dividers 130 configured to divide the lower cuboid into efficient sections. To secure the lower modular rectangular cuboid 110 to an aircraft deck, the lightweight composite galley 100 may employ nonmetallic embedded primary and secondary attachment points 132 to securely couple the galley to the aircraft deck.

The attachment points 132 may be co-cured with the molded sections as well as cold bonded as a pressed panel post process.

For compartment security as well as physically enclosing perishable items within the lower modular rectangular cuboid 110, each lower cart divider 130 may include a lower galley structural door 134. The lower galley structural door 134 may function to securely enclose the section of the lower galley, add to the structural stability of the lower modular rectangular cuboid 110 when closed, as well as insulate the lower modular rectangular cuboid 110 from external airflow and temperature. The lower galley structural door 134 may remove a requirement for retaining conventional turn buttons saving weight and space within the overall lightweight composite galley 100.

The lightweight composite galley 100 may also include an upper modular rectangular cuboid 150 constructed using half of an upper L shaped structure and configured to couple with the lower modular rectangular cuboid 110. The upper modular rectangular cuboid 150 may include an upper left side panel 152, an upper right side panel 154, an upper back panel 156, an upper top panel 158, and an upper base panel 162. The upper modular rectangular cuboid 150 may further include an oven shelf panel 172 configured for supporting an aircraft oven. Some of the upper and lower modular rectangular cuboid panels (e.g., 152 158) may be joined by an externally cured unidirectional carbon fiber pultrusion 174 configured to receive each of a pair of perpendicular panels and join one to the other.

Similar to the lower modular rectangular cuboid 110, the upper modular rectangular cuboid 150 may include an upper structural hoop 160 for structural integrity. The upper structural hoop 160 may be embedded within a periphery of the upper back panel 156. As described in the lower structural hoop 120 above, the upper structural hoop 160 may assist in transferring flight and crash loads around the periphery of the panel between the upper 150 to lower modular rectangular cuboids 110. As above in the case of the lower rectangular cuboid 110, the upper modular rectangular cuboid 150 may include structural hoops 160 molded around each of the individual panels of the upper modular rectangular cuboid 150.

For increased structural performance, the upper modular rectangular cuboid 150 may be configured to couple with and structurally integrate with the lower modular rectangular cuboid 110 to form a work deck. The work deck may function as a place for crewmembers to perform tasks associated with the aircraft galley. In this manner, each of the cuboids may structurally benefit from the attachment to the other. In embodiments, the lightweight composite galley 100 may be shaped to conform with an interior shape of an aircraft cabin and maintain significant structural strength as if the galley were shaped differently. Merely because the galley may present a curved exterior shape, the structural integrity and strength of the composite galley structure 100 may be equivalent to a galley of differing shape.

The lightweight composite galley 100 may be designed without metallic extrusions normally used to assemble the carcass of an aircraft monument. This design may result in a favorable overall weight, and elimination of cold bridges within a chilled compartment and negating any potential for galvanic corrosion issues caused when aluminum is in direct contact with carbon fiber.

In one embodiment of the inventive concepts disclosed herein, each panel (e.g., upper back panel 156, lower side panel 112, etc.) of each modular rectangular cuboid 110 150 may be constructed of layers of a spread tow fabric unidirectional carbon fiber faced pre pressed carbon panel to create individual panels of very lightweight and high structural strength. In embodiments, the lightweight composite galley 100 may be molded from Carbon, Para Aramid (e.g., Kevlar/Twaron), and Glassfiber to provide strength where desired.

In embodiments, each panel of the lightweight composite galley 100 may be constructed of a plurality of materials including a Carbon Fiber Reinforced Polymers (CFRP). These CFRPs may be characterized by: Light weight; High strength-to-weight ratio; Very High modulus elasticity-to-weight ratio; High Fatigue strength; Good corrosion resistance; and a very low coefficient of thermal expansion. To ensure a safe and efficient galley structure, some embodiments of the inventive concepts disclosed herein may include the lightweight composite galley 100 comprised of one or more CFRP panels joined with one or more panels of a different construction. In this manner, a manufacturer may opt for strength in a specific area of the galley while maximizing other properties in another area of the galley. To combat Low impact resistance; and high electric conductivity, the lightweight composite galley 100 may include protective layers and grounding points within the structure if required.

Figure 2A:
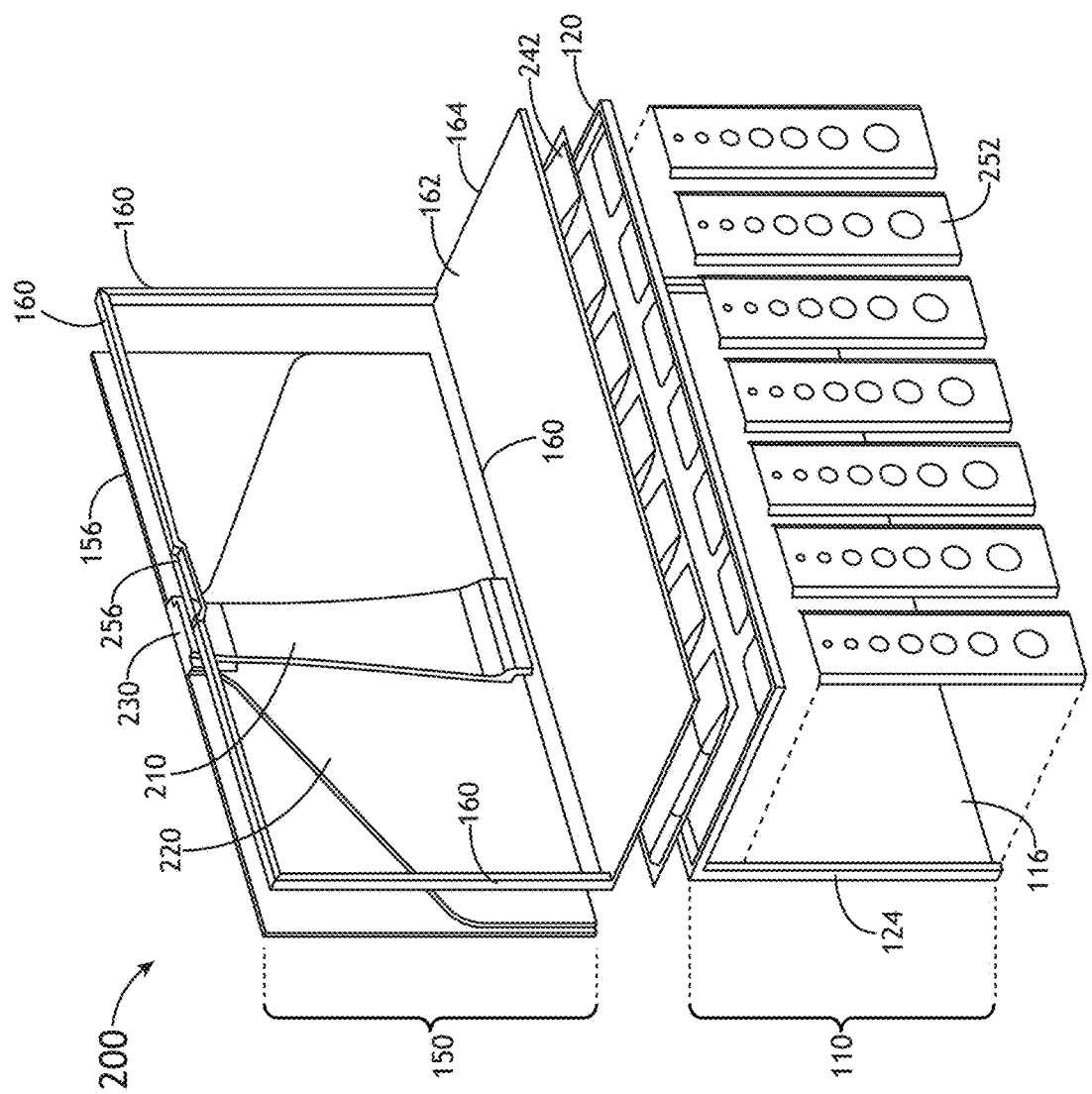
FIGS. 2A & 2B are diagrams of a galley exploded view and air duct details in accordance with an embodiment of the inventive concepts disclosed herein.
Figure 2B:
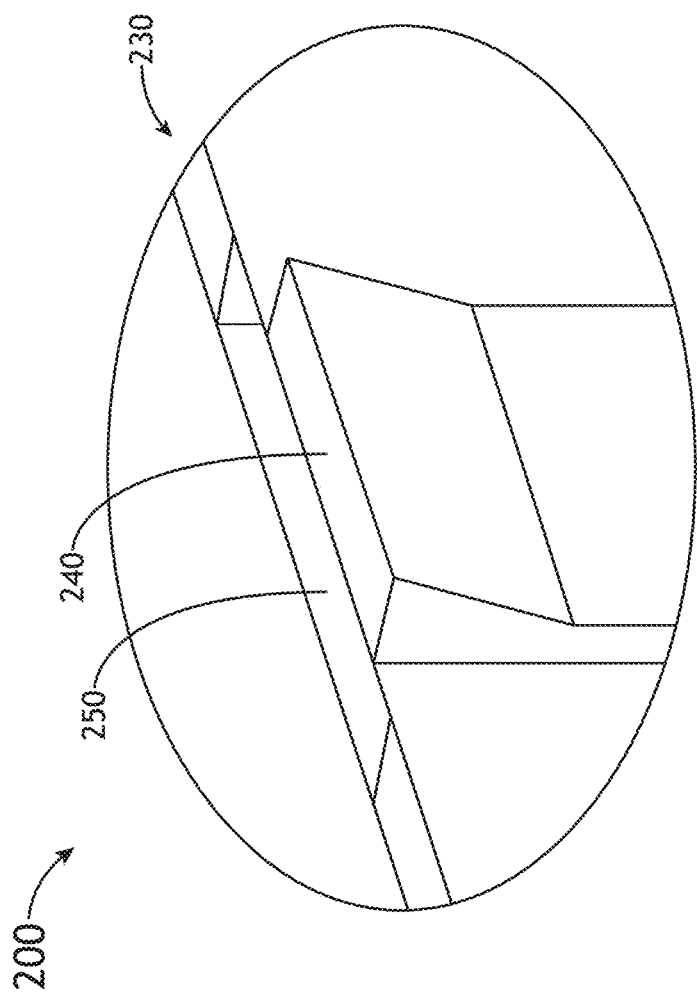

FIG. 2A 2B Galley Detail

Referring now to FIGS. 2A and 2B, are diagrams of a galley exploded view and air duct details in accordance with an embodiment of the inventive concepts disclosed herein are shown. A galley exploded view 200 may detail each of the structures within the lightweight composite galley 100. Each of the upper modular rectangular cuboid 150 and the lower modular rectangular cuboid 110 may include preformed embedded carbon beams 124 164 molded within the panel structure along one or more edges of the structural sections. Here, a lower embedded beam 124 may be embedded within edges of the lower back panel 116 while upper embedded beams 164 may be embedded within edges of the upper base panel 162. These preformed embedded beams 124 164 may function to stiffen each structure of the lower modular rectangular cuboid 110 and the upper modular rectangular cuboid 150. Cross section details of each of the embedded hoops 120 160 and embedded beams 124 164 may be best seen in FIGS. 8A-8O below.

In one embodiment of the inventive concepts disclosed herein, the upper modular rectangular cuboid 150 may include one elongated side (e.g., the upper back panel 156) with an embedded upper structural hoop 160 while and adjacent side (e.g., the upper base panel 162) may be configured with the embedded carbon beams 164. In this manner, the upper structural hoop 160 may function to carry flight and crash loads within the upper back panel 156 while the embedded beams 164 may work in cooperation with the upper structural hoop 160 to stiffen the overall L shaped structure. Then, as additional panels are added, the overall cuboid structure may enhance the structural integrity of the hoops 160 and beams 164 to create a lightweight composite galley 100 of great strength to weight ratio.

In one embodiment of the inventive concepts disclosed herein, some of the panels of the upper and lower modular rectangular cuboid 110 150 may incorporate molded duct work to distribute a conditioned airflow around compartments containing one or more food service trolleys. In one embodiment, the ducts above work deck may be contained within the load bearing hoops 160. Here, an Air Supply Duct 210 and an Air Return Duct 220 may function to distribute conditioned air to the lower modular rectangular cuboid 110 as well as evacuate a return airflow from the lower modular rectangular cuboid 110.

A siamese air port 230 may function to mate with a chiller airduct supply and return configured to supply the lightweight composite galley 100. Exemplary chillers may include a stand-alone device installed on the galley or within the aircraft airframe. The associated chiller may be a line replaceable unit specifically configured to supply the galley. Within the siamese air port 230, a siamese supply port 240 may function to channel the conditioned air from the chiller to the air supply duct 210 while a siamese return port 250 may function to return the air from the lower modular rectangular cuboid 110 to the chiller return. Embedded within the lower top panel 118, a series of lower top air pathways 242 may function to channel the conditioned air to a forward portion of the lower modular rectangular cuboid 110 while a series of lower back air return pathways 252 in the form of "U" section plenum, graduated inlet apertures may function to draw air from the lower modular rectangular cuboid 110 and channel the used air to the air return duct 220.

Structurally, within the upper structural hoop 160, an air chiller interface port 256 may continue to structurally support the upper structural hoop 160 while offering an opening port for the siamese air port 230 to interface with the air supply and return air ducting of the air chiller in the host aircraft.

In one embodiment of the inventive concepts disclosed herein, the lightweight composite galley 100 may remain chilled or un-chilled. Should an operator desire an un-chilled galley of lesser weight and cost, the upper back panel 156 may be a simple flat panel and each of the lower top air pathways 242 and the lower back air return ports may be removed allowing for greater space within both of the upper modular rectangular cuboid 150 and the lower modular rectangular cuboid 110.

FIG. 3 Upper Structural Section

Referring now to FIGS. 3A-3E, diagrams of an upper structural section exemplary of an embodiment of the inventive concepts disclosed herein are shown. The L-shaped upper structural–section 300 of the upper modular rectangular cuboid 150 may include the upper back panel 156 molded with the upper base panel 162 to which additional pre pressed flat panels may be joined to produce the lightweight composite galley 100. The upper structural section may provide structural support for a plurality of appliances associated with an Above Work Deck (AWD) galley configuration as well as house each of the air supply duct 210 and air return duct 220.

The upper (and lower, FIG. 4) may include molded U channels, to allow efficient installation of the pre formed flat panels that comprise the balance of the monument. Similar in function to the carbon external cured carbon fiber pultrusion 174, these U channels may function to receive one or more edges of a panel effectively acting as an efficient assembly jig. Here, an upper vertical channel 360 may be incorporated within the upper structural hoop 160, an upper horizontal channel 364 may be incorporated within an edge of the upper base panel 162, and an upper top channel 362 may be configured to receive the upper top panel 158.

FIG. 4 Lower Structural Section

Referring now to FIGS. 4A-4E, diagrams of a lower structural section exemplary of one embodiment of the inventive concepts disclosed herein are shown. The lower structural section 400 may similarly include a lower horizontal channel 420 proximal with the lower top panel 118 as well as a lower vertical channel 422 proximal with the lower back panel 116. The lower top panel 118 may be comprised of a laminate skin of two to seven layers without an enclosed core, forming a recess to allow the installation of air path ducting.

FIG. 5 Assembly

Referring now to FIG. 5, a diagram of an assembly view in accordance with one embodiment of the inventive concepts disclosed herein is shown. Here, the upper modular rectangular cuboid 150 and the lower modular rectangular cuboid 110 (the two L shapes) may be indicated in an assembly view 500. Indicated here, a non-chilled galley is shown without ductwork.

FIG. 6 Assembled Sections

Figure 6A:
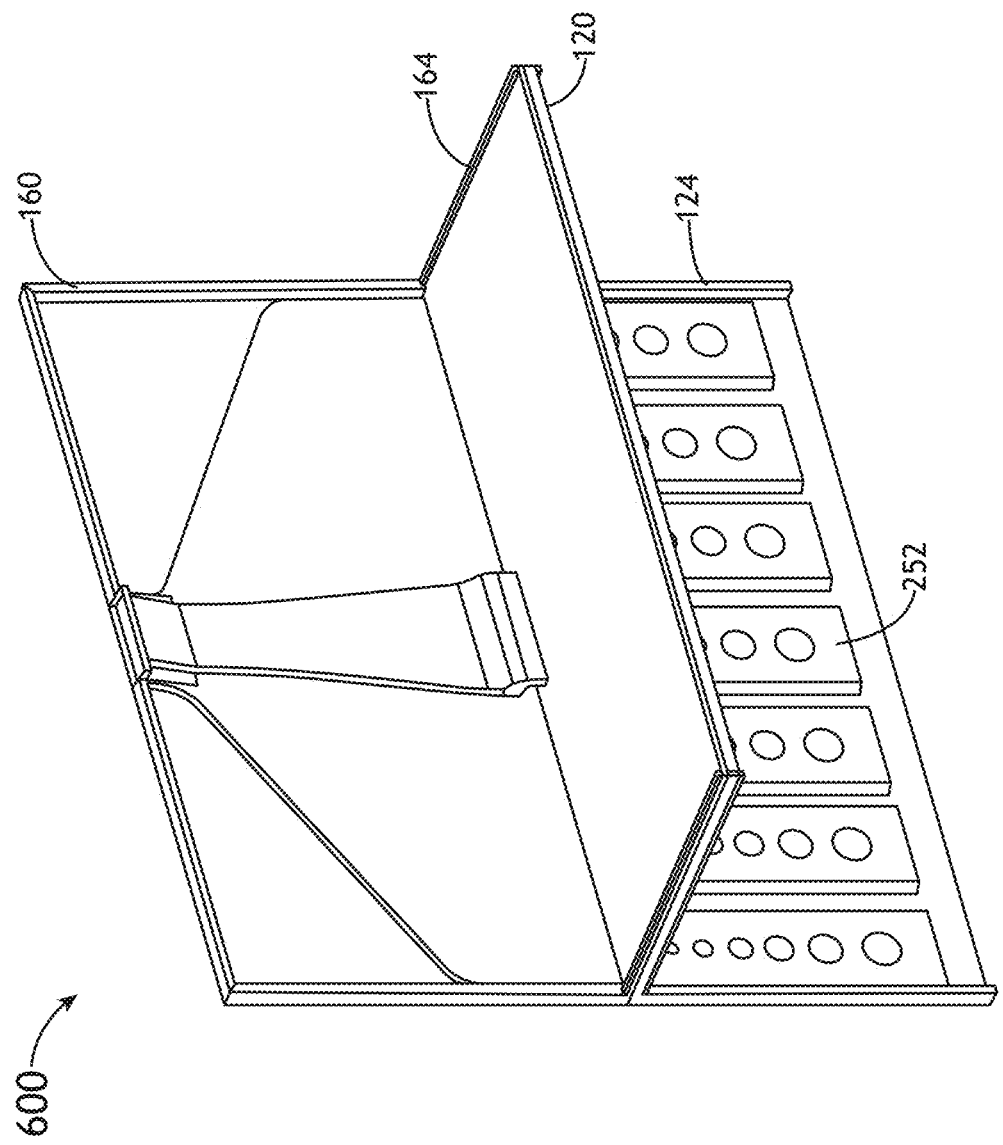
FIGS. 6A and 6B are diagrams of an exemplary assembled galley in accordance with one embodiment of the inventive concepts disclosed herein.
Figure 6B:
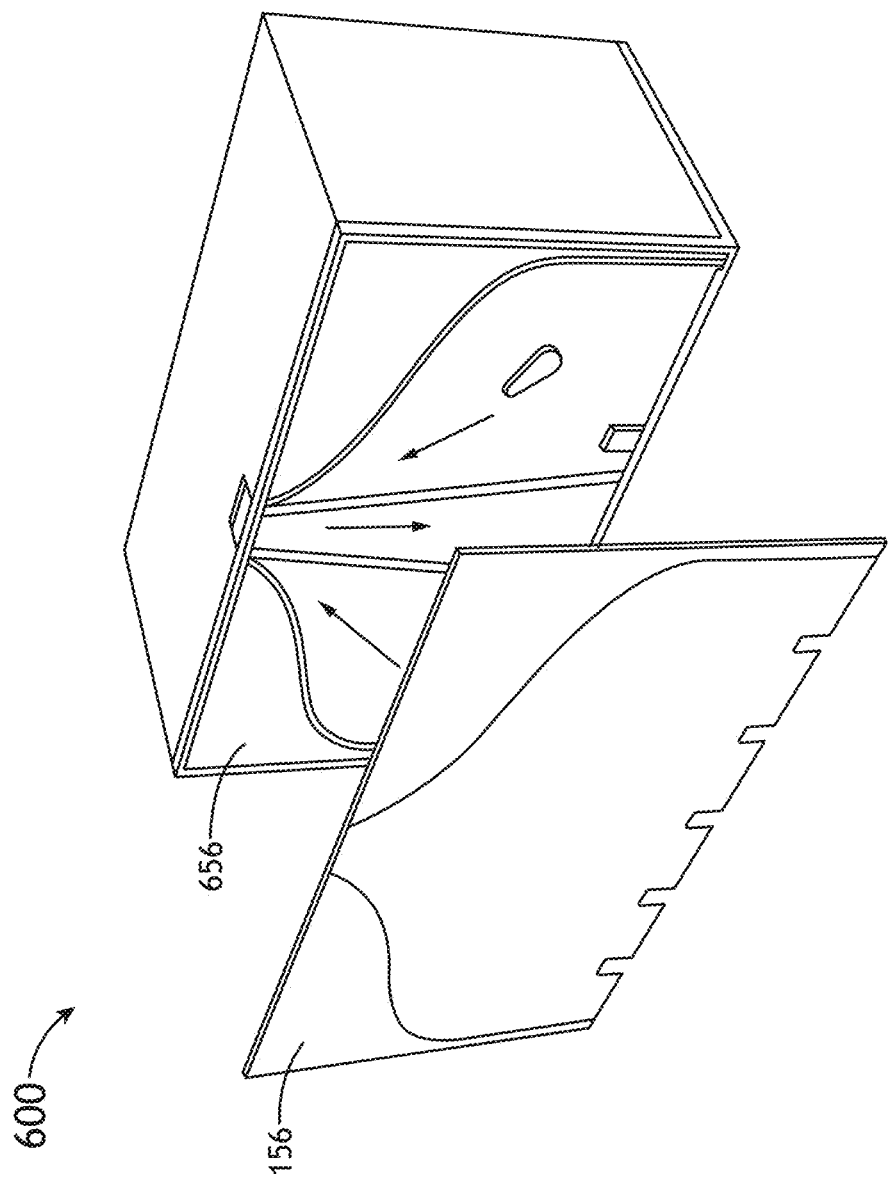

Referring now to FIGS. 6A and 6B, diagrams of an exemplary assembled galley in accordance with one embodiment of the inventive concepts disclosed herein are shown. An assembled galley view 600 may indicate each of the upper structural section 300 coupled with the lower structural section 400. Once the upper back panel 156 is in place, an upper close out panel 656 may function to enclose each of the air supply duct 210 and the air return duct 220.

Figure 7:
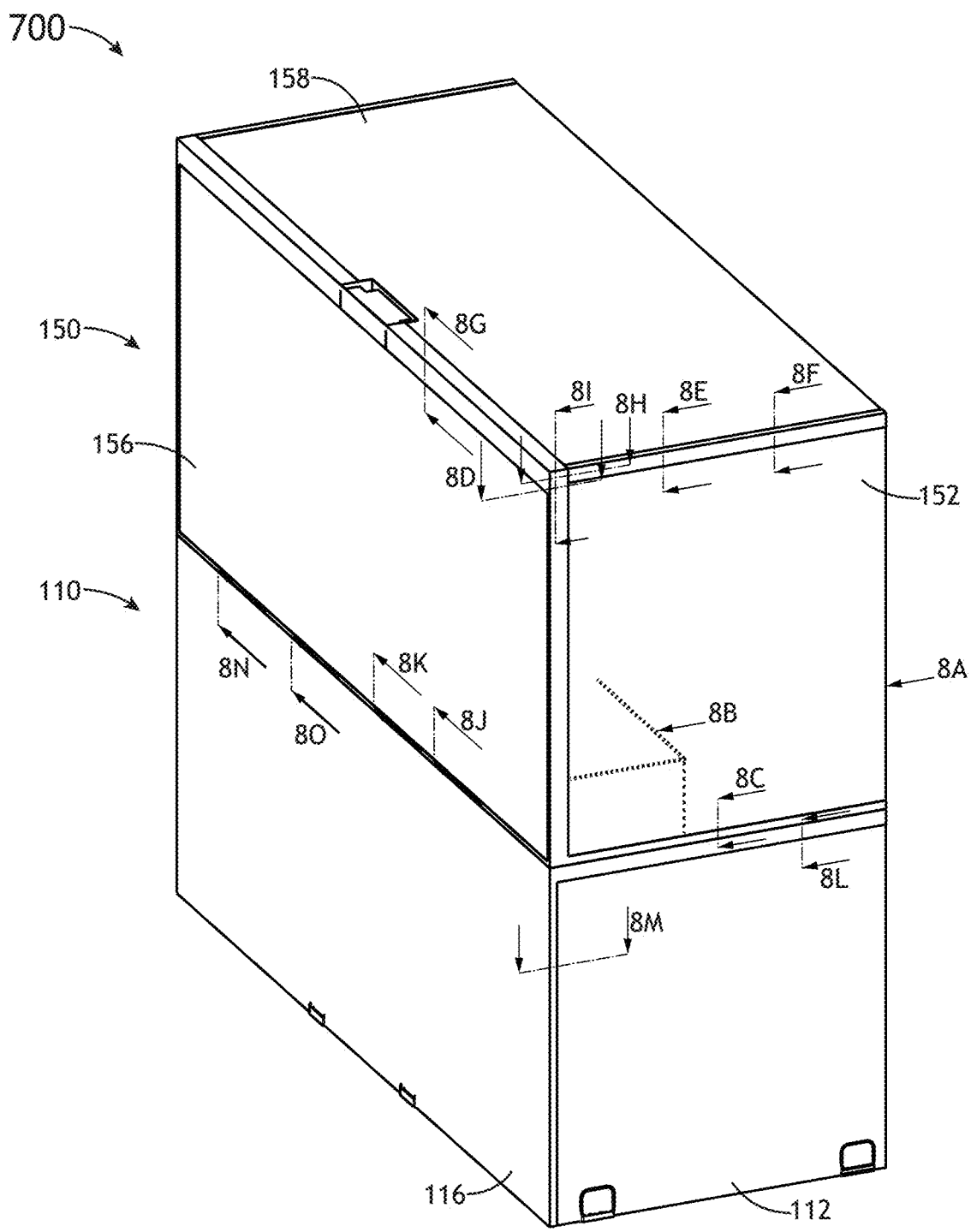
FIG. 7 is a diagram of galley construction detail and associated key to each view of FIGS. 8C through 8O associated with one embodiment of the inventive concepts disclosed herein.

FIG. 7 Galley Isometric

Referring now to FIG. 7, a diagram of galley construction detail and associated key to each view of FIGS. 8C through 8O associated with one embodiment of the inventive concepts disclosed herein is shown. A key to each of the FIG. 8 and a direction of view may be indicated within FIG. 7. For example, FIG. 8M is a cross section view of the adjoining lower left side panel 112 and the lower back panel 116. In this manner, the exemplary hoops and beams embedded within the lightweight composite galley 100 may be accurately indicated.

FIG. 8 Construction Detail

Referring now to FIGS. 8A-8O, diagrams of detailed galley construction exemplary of one embodiment of the inventive concepts disclosed herein is shown.

FIGS. 8A and 8B may indicate examples of an exploded cross section of a composite panel structure 800. FIG. 8A may detail a view of the composite panel structure as viewed from the front of the upper side panel 152 while FIG. 8B may detail a view of the over shelf 172 as viewed from the front of the galley. Here, each diagram may detail each of a type one 852 and type two 850 composite panel structure. Once molded together, each of the type one 852 and type two 850 composite panel structures may present a width of approximately 0.394 inches and a weight of approximately 3.43 ounces per square foot.

Type 1 Panel

FIG. 8A may detail an exemplary embodiment of the composite panel structure 800 used in coordination with the inventive concepts disclosed herein. A type one composite panel 852 may comprise an inner core panel 810 surrounded by layers of an adhesive film 840. Molded to the adhesive film 840, layers of a 0/90 STF face sheet 830 further surrounded and strengthened by a pair of 45/45 STF face sheets 820 which may function to strengthen the overall composite panel structure 800. In one embodiment of the inventive concepts disclosed herein, the inner STF face sheets 830 maintain a weave of 0/90 while the outer STF faces sheets 820 maintain a weave of 45/45. Contemplated herein, each of the STF face sheets 820 830 may be altered in order relative to the inner core sheet 810 as well as molded in a plurality of directions relative to each other.

In embodiments, the STF face sheets 820 830 may be combined with fire resistant epoxy and/or phenolic (and additional) matrix systems to produce certifiable pre pressed panels for use in the manufacture of the assembled aircraft interior monument 100. When molded with the inner core sheet 810 comprised of a honeycomb structure, the STF face sheets 820 830 function to reduce the negative impact of the ribbon core direction strength limitation.

With the STF face sheets 820 830 molded, the composite panel structure 800 may possess similar biaxial tensile strength characteristics in both an x and a y direction. The composite panel structure 800 may be used in both a pre formed pressed panel process and for tooled composite moldings and may be combined with other types of Para and Meta Aramid reinforcements to provide specific strength, weight, durability and longevity characteristics.

Type 2 Panel

FIG. 8B may detail one embodiment of the inventive concepts disclosed herein. The composite panel structure 800 may include a plurality of parallel carbon fiber Spread Tow Fabric (STF) face sheets molded together to create the composite panel structure 800. The composite panel structure 800 may be comprised of a type two composite panel structure 850 in certain areas as well as a type one composite panel structure 852 in other areas. Depending on desired strength, the assembled aircraft monument 100 may use one or more types of the composite panel structure 800 to accomplish a strength goal.

The type two composite panel structure 850 may include two heavy STF face sheets 836 surrounding, and molded with, the inner core sheet 810. The type two composite panel structure 850 may be produced by molding the single outer heavy STF face sheets 836 with and surrounding the inner core sheet 810.

Each heavy STF face sheet 836 may then be fused to the core sheet 810 to form the type two 850 composite panel structure 800. While methods of fusing and molding the panels may differ, including cold molding and resin infused heated fusing, the final product of the composite panel structure 800 may retain multi-axial strength properties of each of the separate panels after the fusing is complete.

In each of the type one composite panel 852 and the type two composite panel 850, the inner core sheet 810 may be comprised of a plurality of composite material of desirable strength and suitable for molded construction with the STF face sheets 820 830. In embodiments, the inner core sheet 810 may comprise exemplary foam (non-structural) and honeycomb (structural) core structures able to be molded with the external STF face sheets 820 830. In one embodiment of the inventive concepts disclosed herein, the inner core sheet 810 may be comprised of a honeycomb core sheet of a 0.381 inches (9.7 mm) thickness.

The inner core sheet 810 may comprise a plurality of inner core types including a hexagonal cell core sheet. In embodiments, the inner core sheet 810 may be comprised of a 40 kilograms per cubic meter (1.8 mm paper) 3 mm Cell Kevlar or nomex honeycomb core or a 32 kilograms per cubic meter (1.5 mm paper) 3 mm Cell Kevlar or nomex honeycomb core.

Surrounding the inner core sheet 810 the layer of adhesive film 840 may function to adhere to the core sheet and offer a barrier between the individual elements of the inner core sheet 810 and the molded fabric STF face sheets 820 836. In embodiments, the adhesive film 840 may be comprised of a 50 GSM adhesive film layer or 15 GSM adhesion enhancer.

Figure 8C:
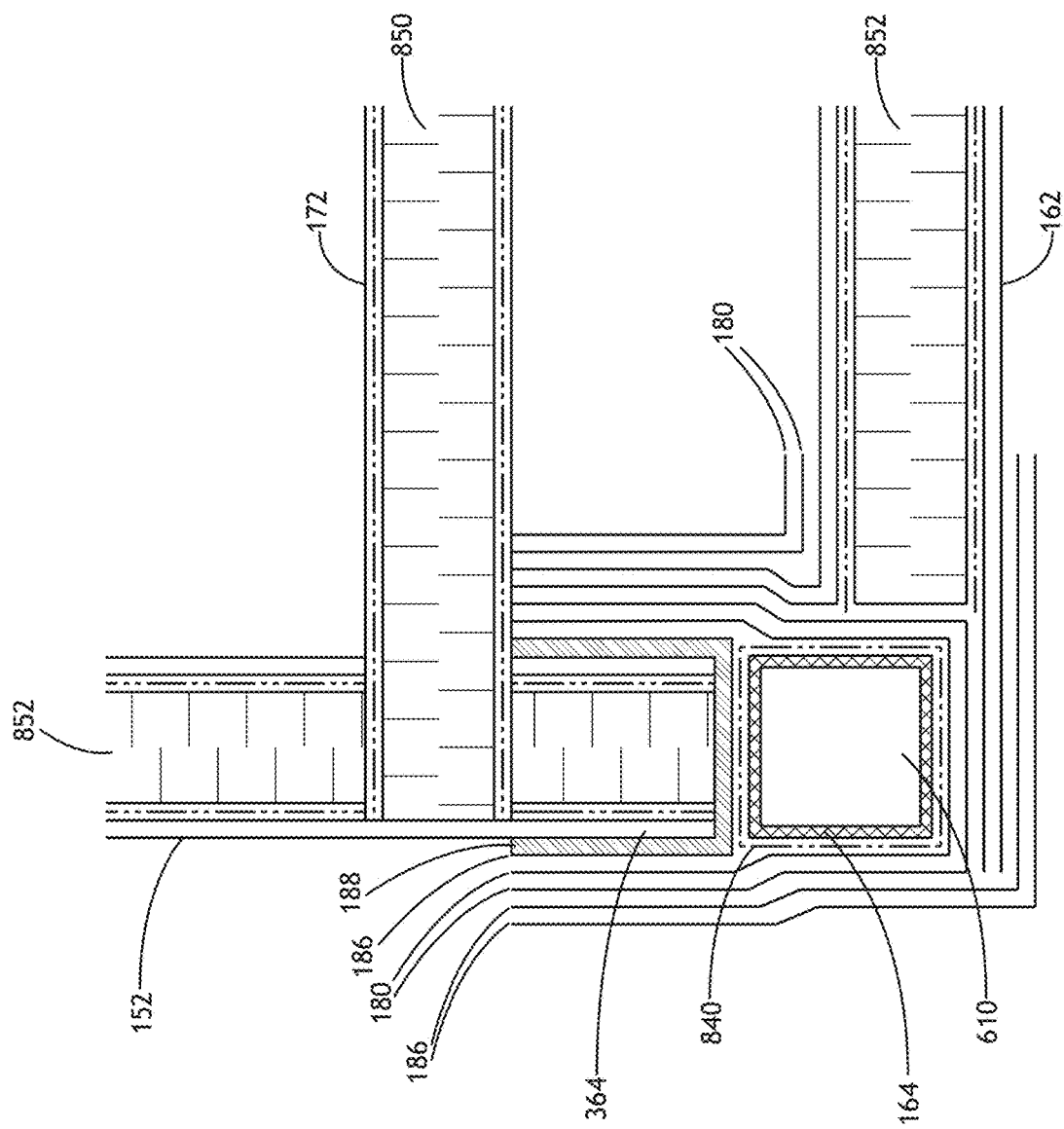
FIGS. 8A-8O are diagrams of detailed galley construction exemplary of one embodiment of the inventive concepts disclosed herein.

FIG. 8C may detail a galley front view indicating a cross section of the upper structural hoop 164. Also, the upper base 162 may be comprised of the type one panel structure 852 while an oven shelf 172 may be comprised of the type two panel structure 850. Adhesive film 840 may be applied to an external of the 164 while one or more layers of 180 may add an additional layer of strength. An outer layer of one or more layers of 186.

Beams and Hoops Cross Section

Each of the hoops and beams embedded within the lightweight composite galley 100 may be constructed of an exemplary 3 ply pre-cured carbon beam of various cross section sizes. A combination of a 500 mm² beam 620 (FIG. 8D), a 320 mm² beam 630 (FIG. 8L), and a 100 mm² beam 610 (FIG. 8C). Each of these beams may be approximate in size and beams of greater and lesser dimension may fall directly within the scope of the inventive concepts disclosed herein. In one embodiment, the 100 mm² beam 610 may be sized at 10×10 mm, the 320 mm² beam 630 may be sized at 10×320 mm, and the 500 mm² beam 620 may be sized at 10×50 mm.

In one embodiment of the inventive concepts disclosed herein, one or more sections of the upper structural hoop 160 may be comprised of the 500 mm2 beam 620 and one or more sections comprised of the 100 mm2 beam 610. One configuration of the upper structural hoop 160 may include two sides and the top comprised of the 500 mm2 beam 620 and the base comprised of the 100 mm2 beam 610.

FIG. 8C may detail an exemplary cross section of the upper modular rectangular cuboid 150 detailing areas associated with the upper left side panel 152 as viewed from the galley front. Here, the upper left side panel 152 and the upper base panel 162 may be comprised of the type one composite panel structure 852. Alternatively, offering a different level of strength, the oven shelf 172 may be comprised of type two composite panel structure 850.

Embedded within the lightweight composite galley 100, the upper embedded beam 164 may function to strengthen the overall structure acting alone. Then, while bonded via a layer of adhesive film 840, with each of the upper left side panel 152 and the upper base panel 162, the embedded beam 164 may offer great structural strength to the lightweight composite galley 100. In this exemplary detail, the upper embedded beam 164 may be comprised of the 100 mm² beam 610.

To receive the upper left side panel 152, the galley structure may be configured with the upper horizontal channel 364 lined with the wet adhesive 188 for securing the upper left side panel 152 in place. Surrounding the wet adhesive 188, a layer of 300 GSM Phenolic Glass 186 followed by two layers of 283 GSM 5 High Strength Carbon 180 and a dual layer of the 300 GSM Phenolic Glass 186 may be one exemplary embodiment of a desirable galley structure. Similarly, on an inside of the joint between the upper side panel 152 and the upper base panel 162, a dual layer of 283 GSM 5 High Strength Carbon 180 may function to strengthen and protect.

The lightweight composite galley 100 may incorporate similar layered structures of embedded beams, adhesive, and bonded carbon glass to tightly mold the structure together to create a galley structure with high strength to weight.

FIG. 8D may detail the upper structural hoop 160 as it may be viewed from above near an upper back corner of the lightweight composite galley 100. In one embodiment of the inventive concepts disclosed herein, the upper structural hoop 160 may be embedded within the galley structure and encircle the entirety of the upper back panel 156 providing great structural strength to the lightweight composite galley 100. Here, the beam used in the displayed cross section may include the 500 mm² beam 620 offering additional strength to the overall design.

The upper vertical channel 360 may be configured to receive the upper left side panel 152 and bond via the wet adhesive 188. Also, the upper back panel 156 may bond with the upper structural hoop 160 via the wet adhesive 188.

FIG. 8E may detail an exemplary tongue and grove joint between panels where no beam or hoop may be present. Here, a view of the upper top panel 158 joining with the upper left side panel 152 may be strengthened by an external cured carbon fiber pultrusion 174 while the inside of the joint may be strengthened by an internal cured carbon fiber pultrusion 176, each bonded to the respective panels with the wet adhesive 188. Additional joints without an embedded beam or hoop may follow this example.

Figure 8F:
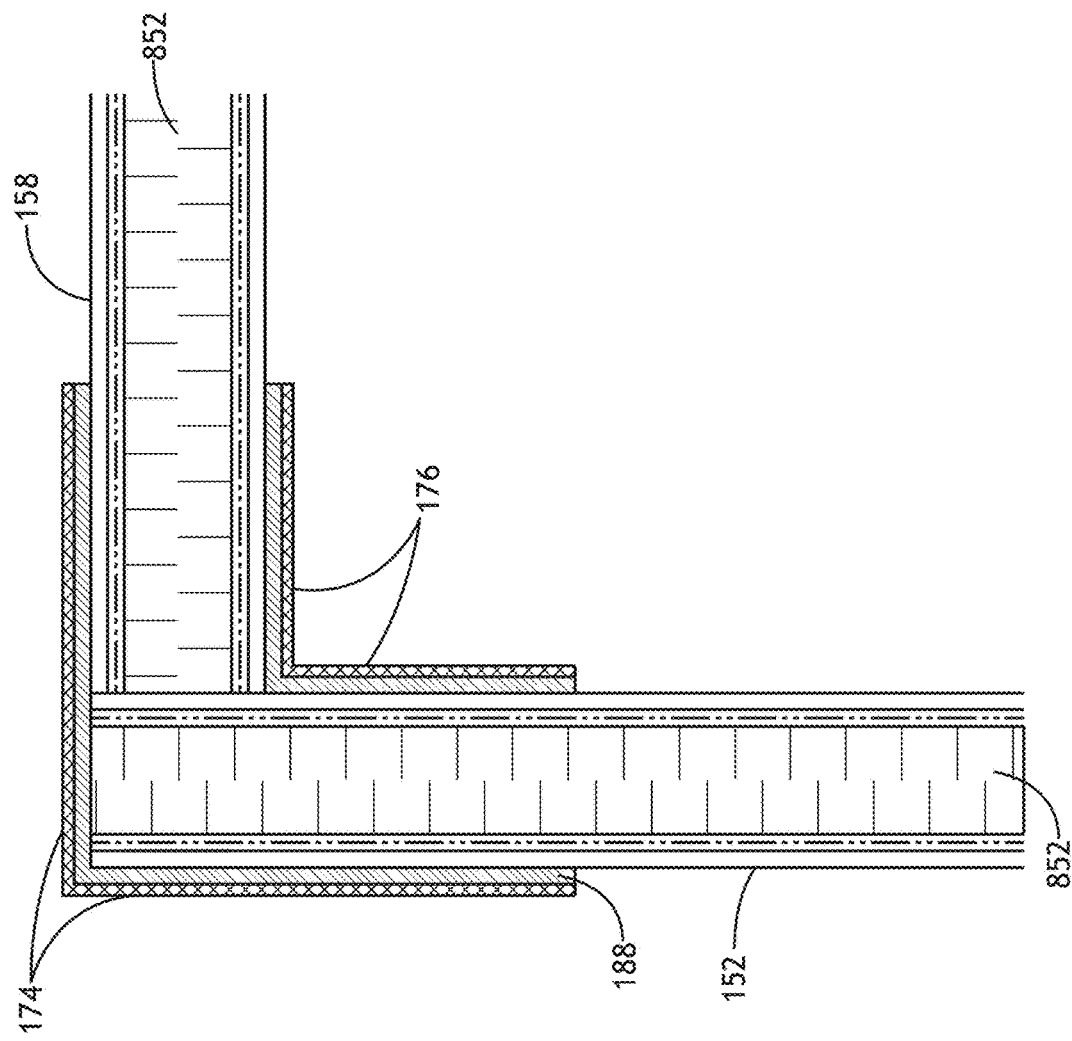

FIG. 8F may detail a similar view of the upper modular rectangular cuboid 150 viewed from the front. An exemplary butt joint may join the upper top panel 158 and the upper left side panel 152. Some embodiments may use solely the tongue grove joint, solely the butt joint, both joints, or a combination between the two.

Figure 8G:
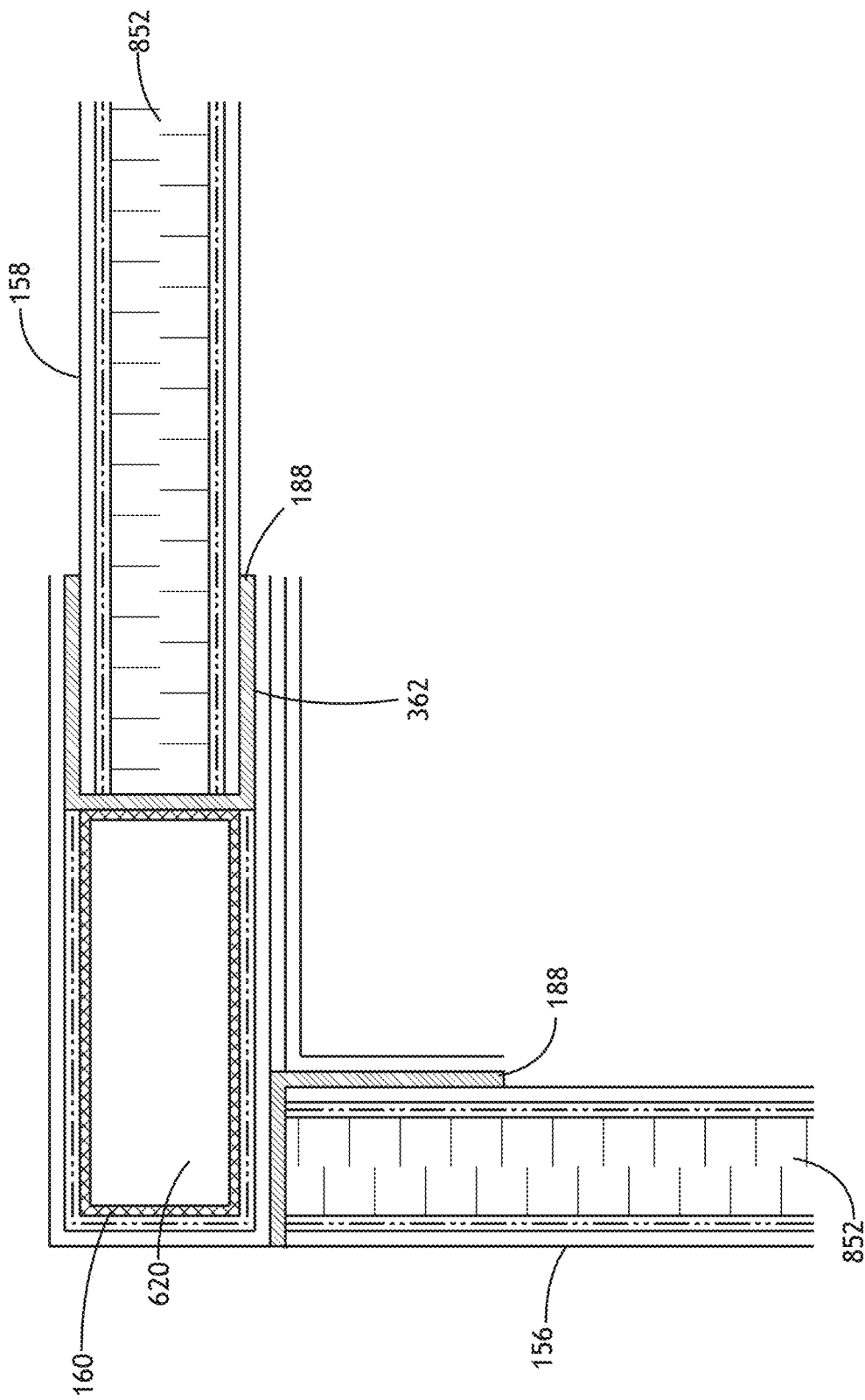

FIG. 8G may detail an exemplary view of the joint between the upper back panel 156 and the upper top panel 158 as viewed from a left side of the upper modular rectangular cuboid 150. The upper structural hoop 160 may be shown continuing around the upper back panel 156. Here the upper structural hoop 160 may also be constructed of the 500 mm2 beam 620 offering additional strength to the overall design. The upper structural hoop 160 may be bonded to the upper top panel 158 via the upper top channel 362 using the wet adhesive 188. Similarly, the upper structural hoop 160 may be bonded to the upper back panel 156 via the wet adhesive 188.

Figure 8H:
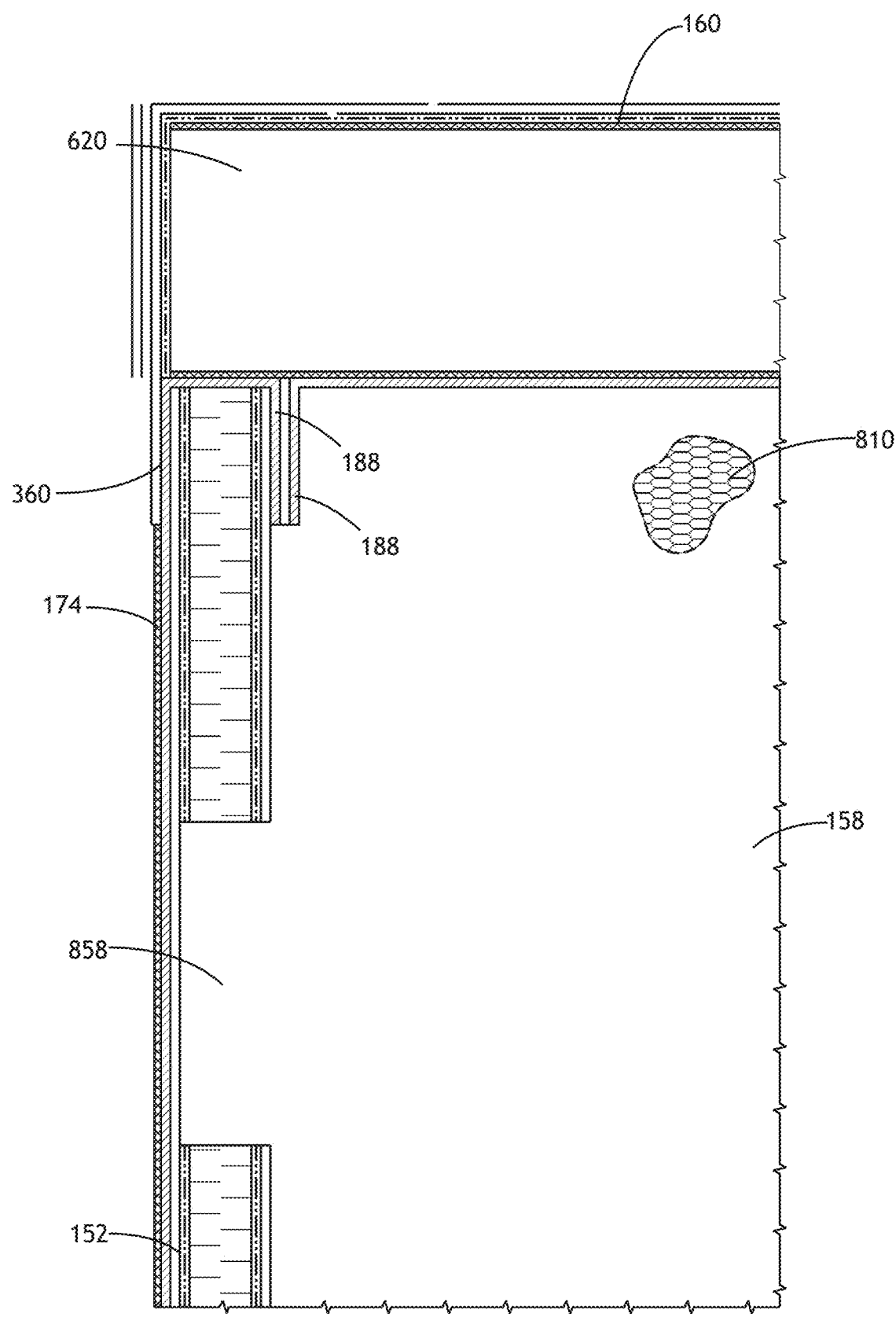
Figure 81:
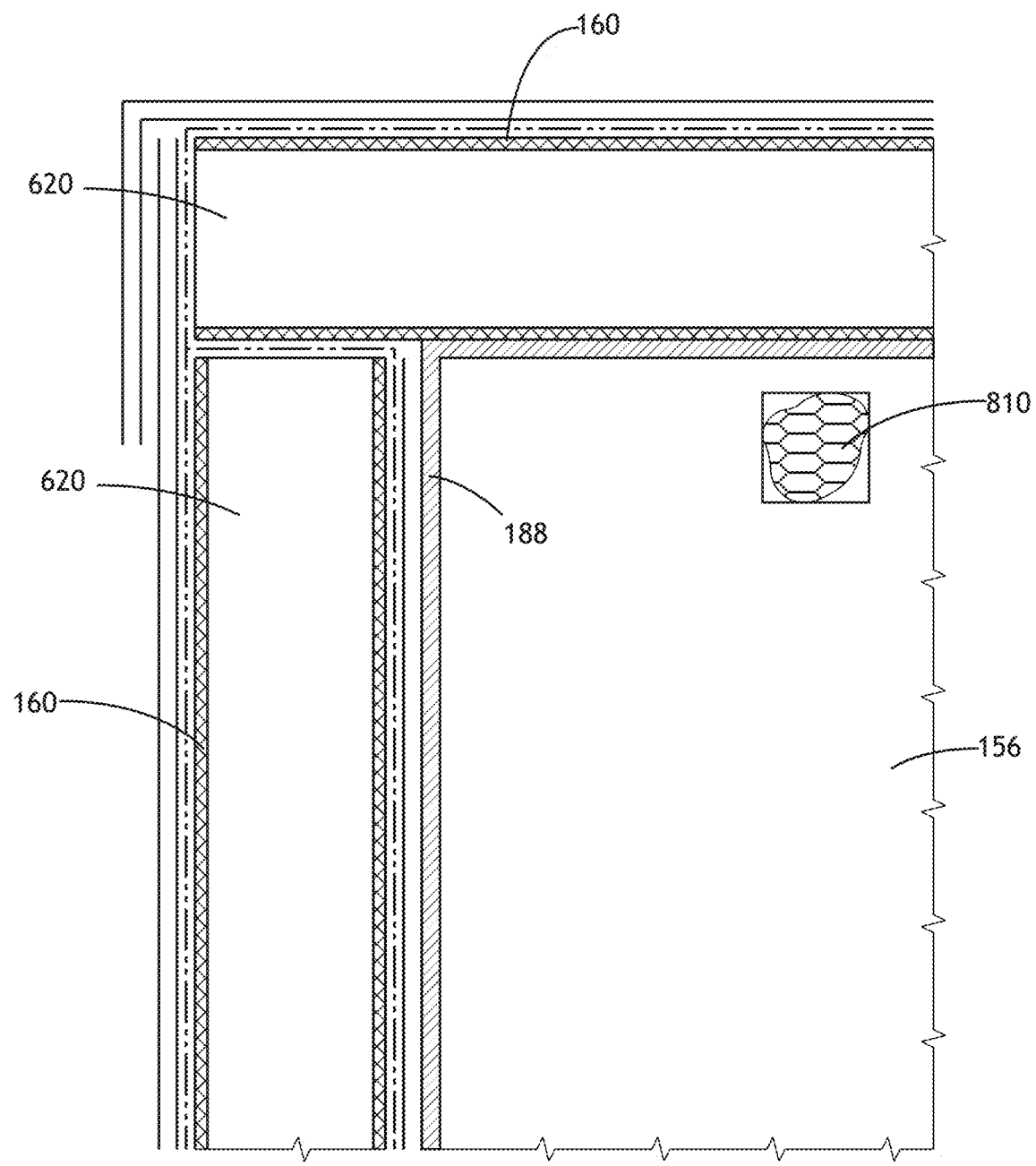

FIG. 8H may detail a view from the top of the upper modular rectangular cuboid 150 indicating an exemplary layout of the upper top panel 158 joining the upper side panel 152. Here, the upper structural hoop 160 may continue along the back of the upper top panel 158. The inner core sheet 810 may be indicated as a cutout in the upper top panel 158. The upper vertical channel 360 may receive the upper left side panel 152 while a tongue and groove joint using a tongue upper top panel 858 functional to strengthen the joint between the upper top panel 158 and the upper left side panel 152.

FIG. 8I may detail a view of the upper back panel 156 from an inside perspective of the upper modular rectangular cuboid 150. Here, the upper structural hoop 160 may be comprised of the 500 mm² beam 620 joining in the upper left corner. Again, the wet adhesive 188 may function to bond the upper back panel 156 to the upper structural hoop 160.

Figure 8J:
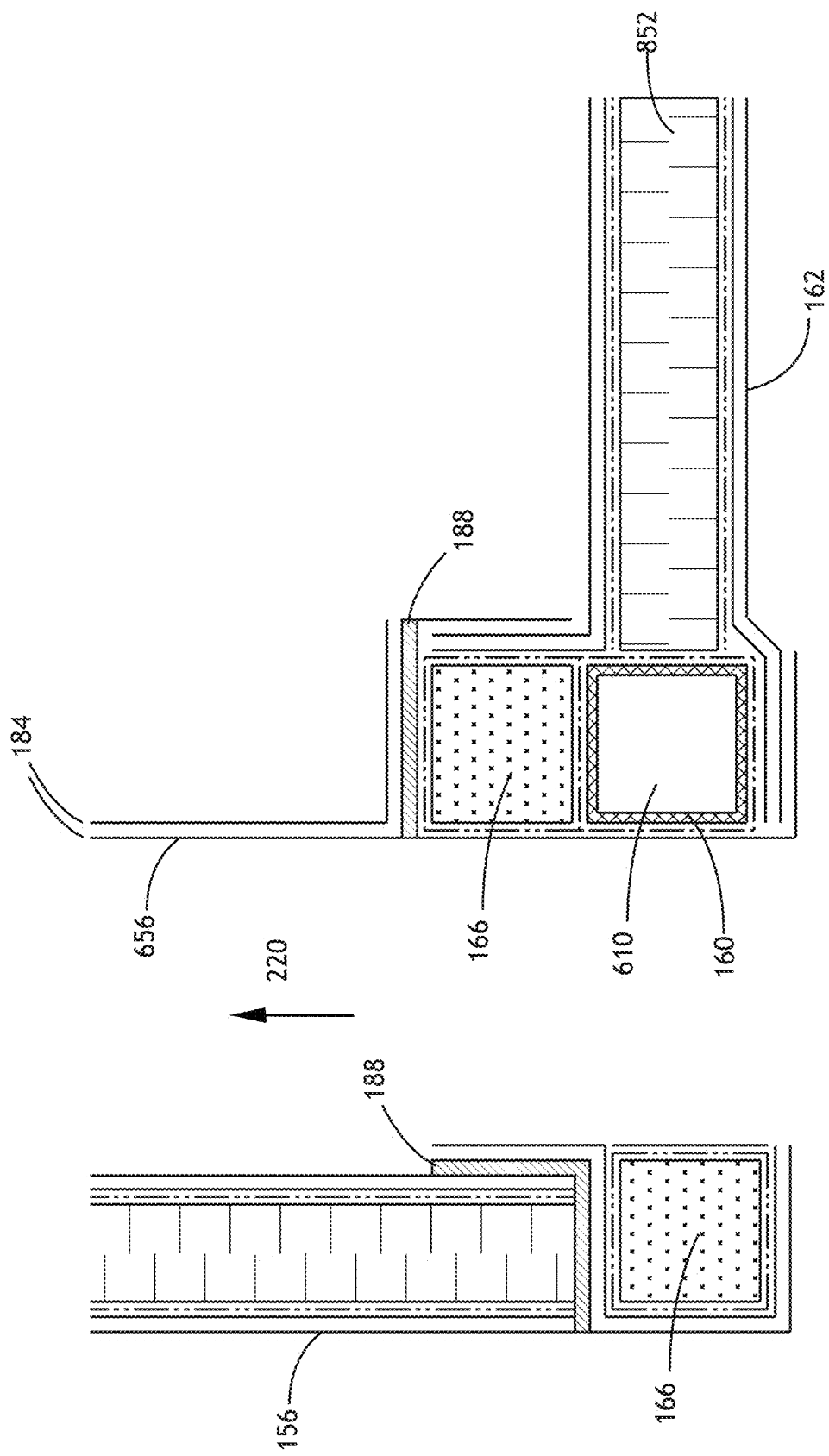

FIG. 8J may detail a cross section of the upper modular rectangular cuboid 150 in an area including the air return duct 220. Here, the upper structural hoop 160 may comprise the 100 mm² beam 610 bonded to the upper base panel 162. Proximal with the upper structural hoop 160, a foam core 166 may function to create a desired space between each of the elements. Here, the foam core 166 may be bonded with the upper close out panel 656 as well as with the upper structural hoop 160.

The air return duct 220 may be indicated with an arrow displaying a direction of the air travel as the air may be channeled vertically between the upper close out panel 656 and the upper back panel 156. In one embodiment, the upper close out panel 656 is comprised of a dual layer of the 175 GSM 3 High Strength Aramid 184.

In one embodiment, the foam core 166 may be sized at 10 mm by 10 mm and the return air duct may be sized at 25 mm allowing for a considerable overlap of the upper structural hoop 160 as the separate sections (500 mm² of FIG. 8D and 100 mm² of FIG. 8J) of the upper structural hoop join near the rear left base (as viewed from a front of the galley) corner of the upper modular rectangular cuboid 150.

Closely related to FIG. 8J, FIG. 8K may detail a similar cross section but in an area not including the air return duct 220. Here, the foam core 166 may be sized to reach from the upper back panel 156 to the upper structural hoop 160. In one embodiment, the foam core 166 may be sized at 10 mm vertically×35 mm horizontally.

Figure 8L:
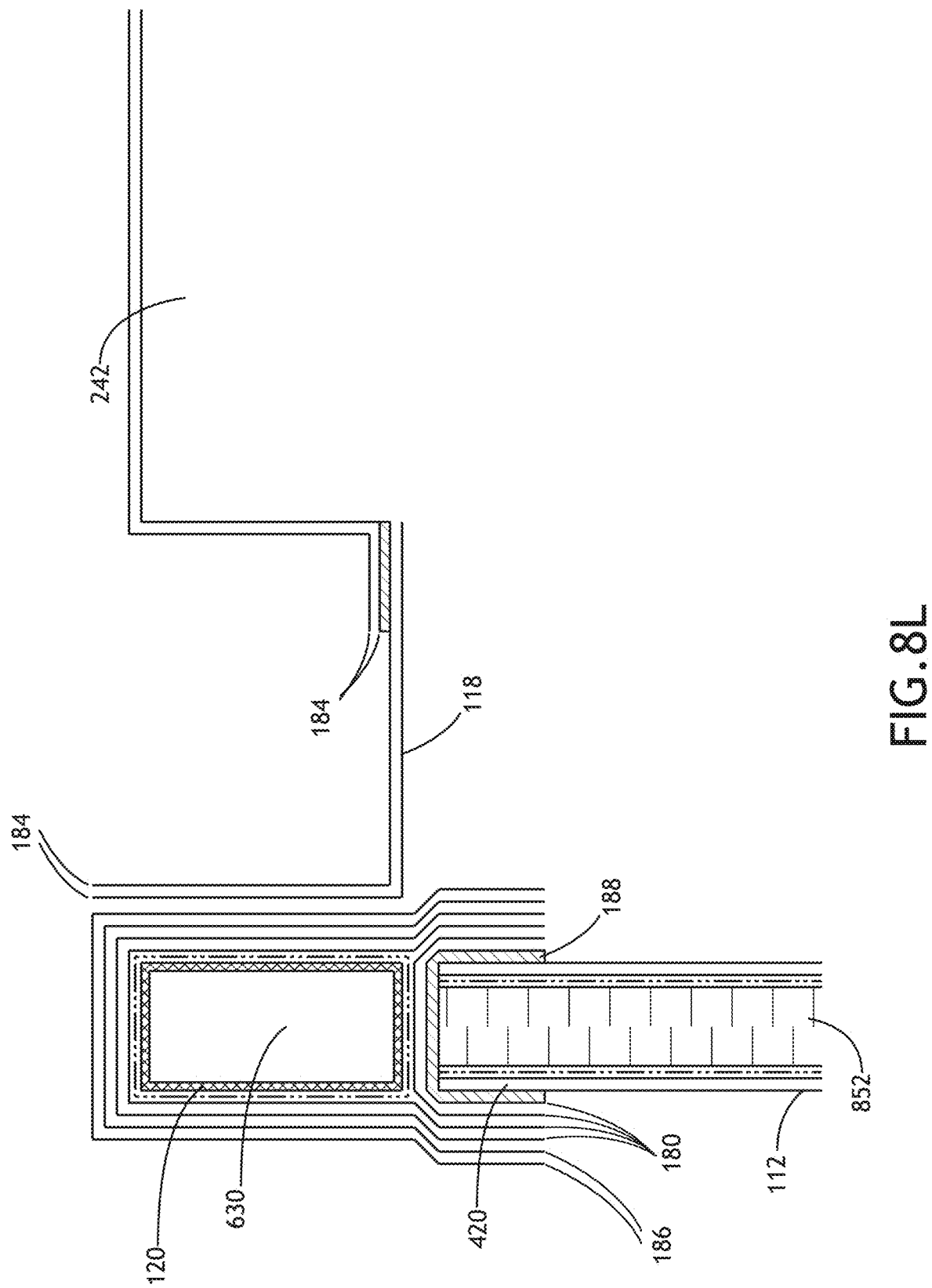
Figure 8M:
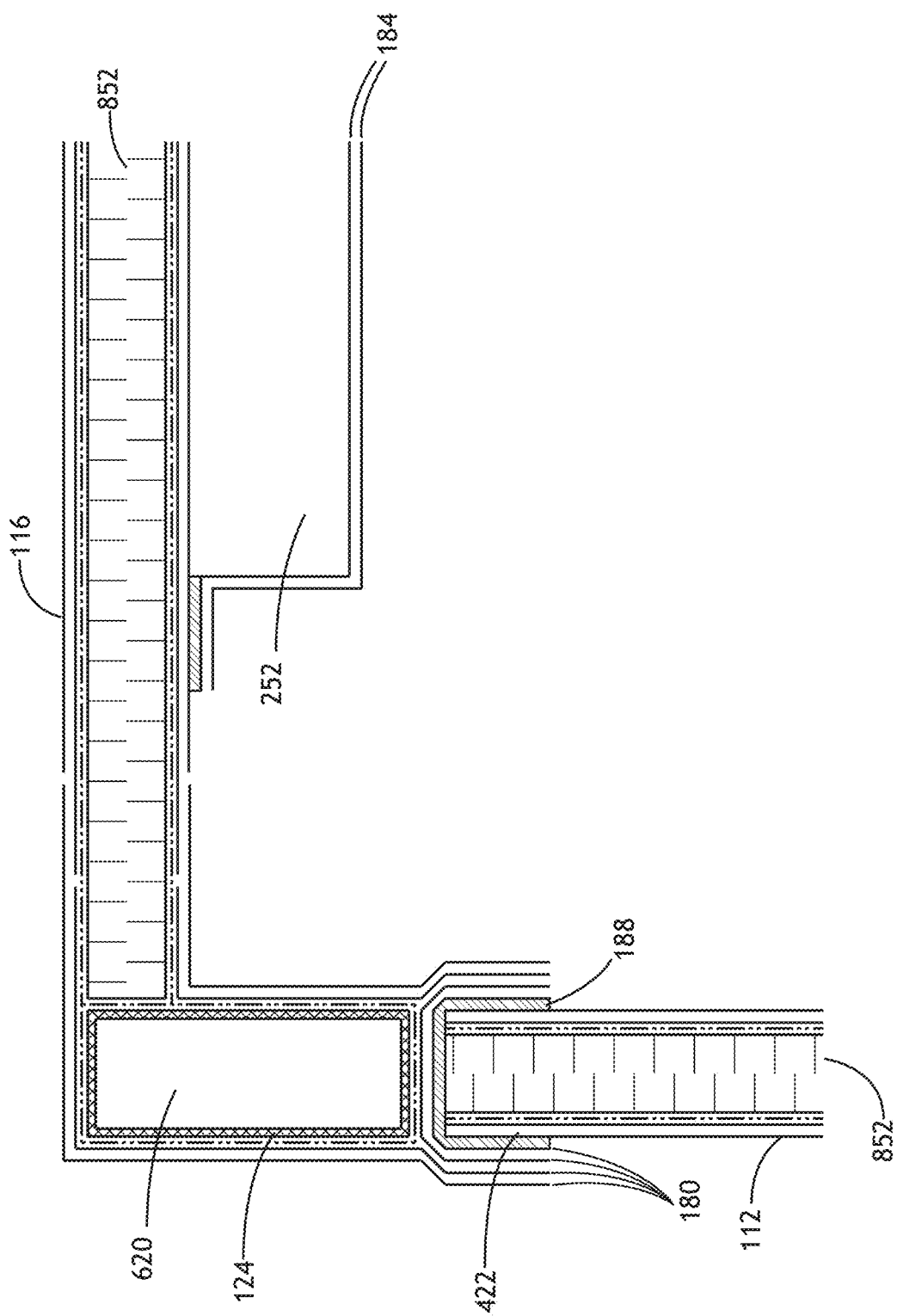
Figure 8N:
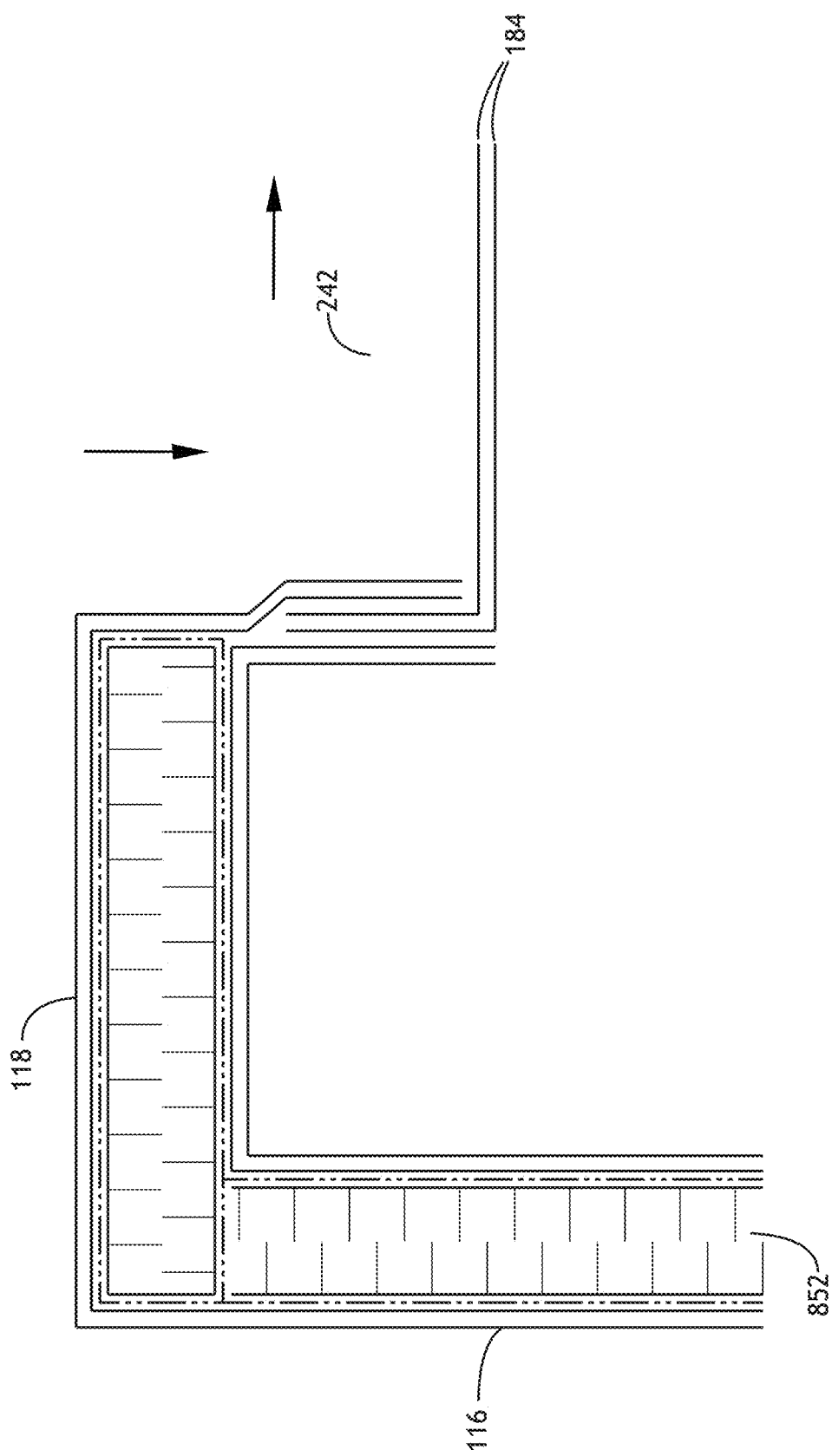
Figure 80:
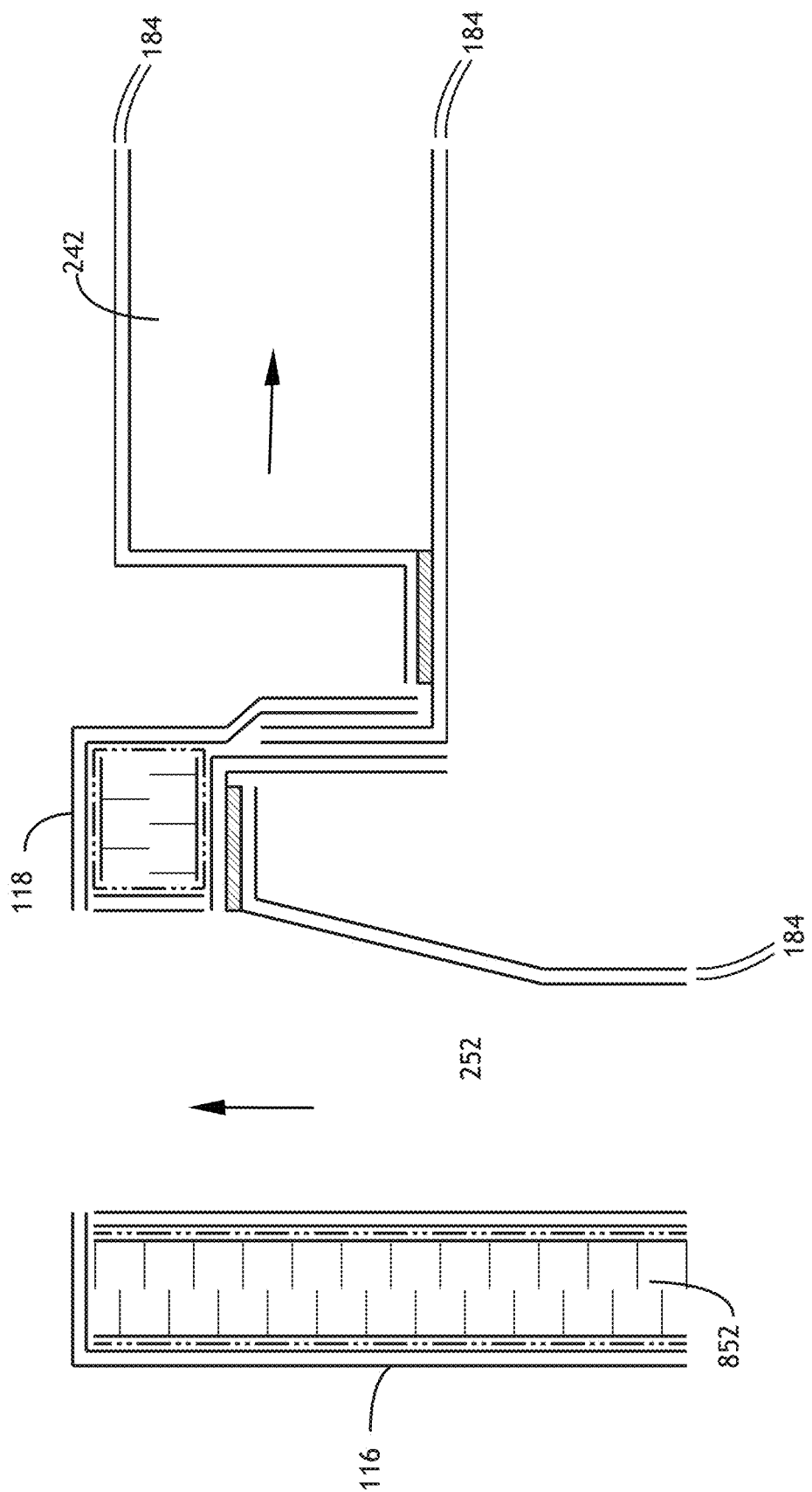

For orientation, the structure found in FIGS. 8J and 8K may carry atop the structure found in FIGS. 8N and 8O. The structure found in FIG. 8C may carry atop the structure found in FIG. 8L.

FIG. 8L may detail a view of a top section of the lower left side panel 112 as it joins with the lower structural hoop 120. In this embodiment, the lower left side panel 112 may fit into the lower horizontal channel 420 and bonded with the lower structural hoop 120 via the wet adhesive 188. A four-layer shell of 283 GSM 5 High Strength Carbon may be bonded with and around the lower left side panel 112 to form the lower horizontal channel 420.

An outer shell of two layers of the 300 GSM Phenolic Glass 186 may protect and strengthen the overall structure. To form the lower top air pathway 242, a dual layer of 175 GSM 3 high strength aramid 184 may function to create the desired pathways for sufficient air flow.

FIG. 8M may detail structure within the lower modular rectangular cuboid 110 viewed as if the viewer were looking down on a rear left corner of the lower modular rectangular cuboid 110 with details of the lower left side panel 112 joining the lower back panel 116. Here, the lower embedded beam 124 may function to strengthen the overall structure and transfer loads from the upper modular rectangular cuboid 150 to the floor of the aircraft to which the lightweight composite galley is mounted. A quad layer of 283 GSM 5 high strength carbon 180 may create the lower vertical channel 422 as well as protect and strengthen the structure. The lower back air return pathways 252 may be comprised of a dual layer of the 175 GSM 3 high strength aramid 184 attached to the lower back panel 116. Of note, a similarity between FIGS. 8D and 8M may indicate a proximity of each aligned vertically with the structure found in FIG. 8D above the structure found in FIG. 8M.

FIG. 8N may detail a view of the lower modular rectangular cuboid 110 indicating the lower back panel 116 joined with the lower top panel 118. Here, the lower top air pathway 242 may be formed of a dual layer of 175 GSM 3 high strength aramid 184. Arrows may indicate a direction of air flow routed from the upper modular rectangular cuboid 150 to the lower top air pathway 242.

FIG. 8O may detail a similar area of the galley but indicating an area where the lower back air return pathways 252 may function to channel the return air from the lower modular rectangular cuboid 110 to the upper 150.

FIG. 9 Method

Figure 9:
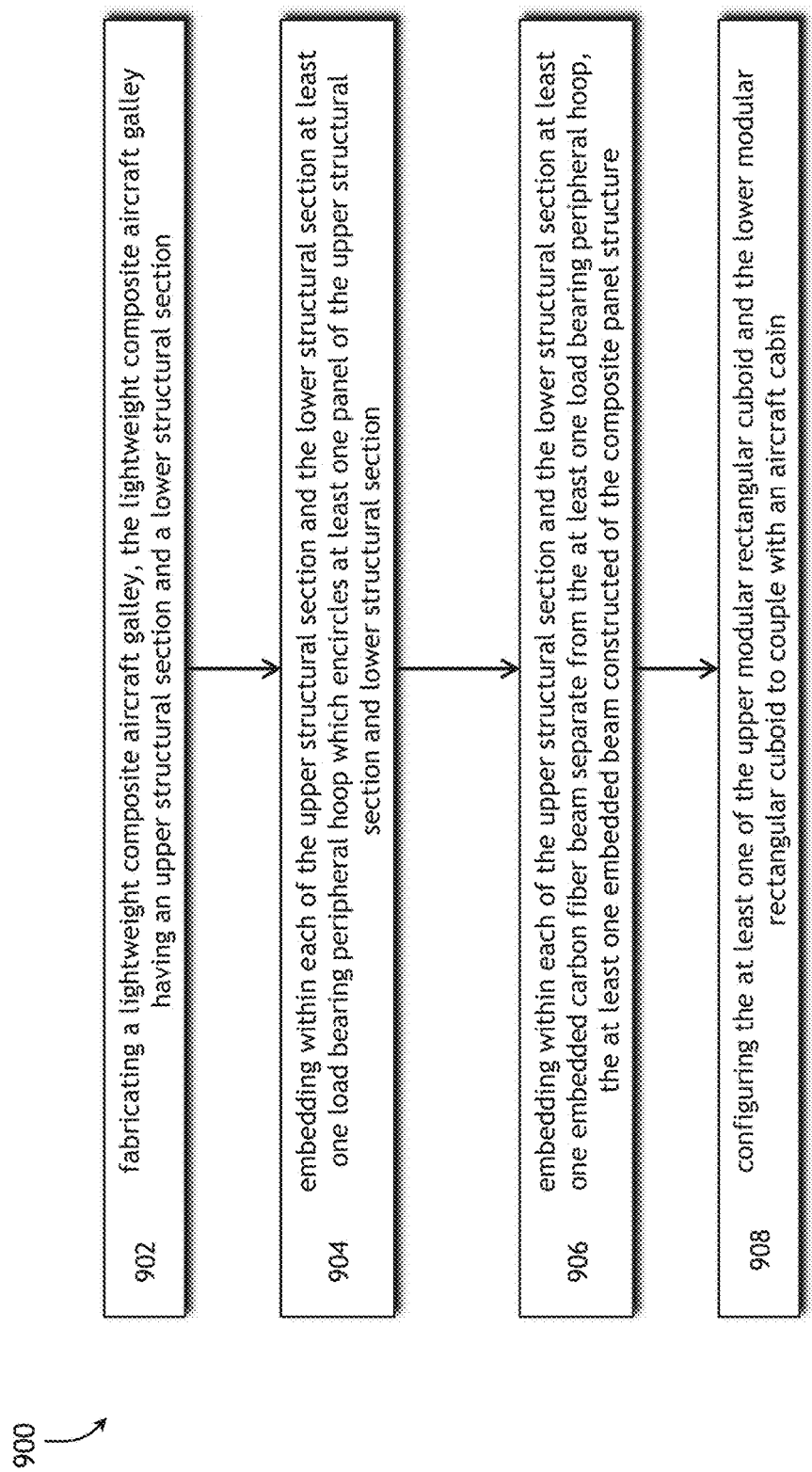
FIG. 9 is a diagram of a method for composite galley construction exemplary of one embodiment of the inventive concepts disclosed herein.

Referring now to FIG. 9, a diagram of a method for composite galley construction exemplary of one embodiment of the inventive concepts disclosed herein is shown. The method for lightweight composite aircraft galley construction 900 may comprise, at a step 902, fabricating a lightweight composite aircraft galley, the lightweight composite aircraft galley comprised of an upper modular rectangular cuboid coupled with a lower modular rectangular cuboid. The upper modular rectangular cuboid may include an upper structural section, the upper structural section comprising two perpendicular upper contiguous elongated panels, the two perpendicular upper contiguous elongated panels constructed of a composite panel structure. The lower modular rectangular cuboid may include a lower structural section, the lower structural section comprising two lower perpendicular contiguous elongated panels, the two perpendicular lower contiguous elongated panels constructed of the composite panel structure.

The method may include, at a step 904, with embedding within each of the upper structural section and the lower structural section at least one load bearing peripheral hoop configured for transferring a flight load and a crash load between the upper modular rectangular cuboid and the lower modular rectangular cuboid without a metallic extrusion, the at least one load bearing peripheral hoop encircles at least one panel of the upper structural section and encircles at least one panel of the lower structural section.

The method may include, at a step 906, with embedding within each of the upper structural section and the lower structural section at least one embedded carbon fiber beam separate from the at least one load bearing peripheral hoop, the at least one embedded carbon fiber beam configured for maintaining a physical integrity of each of the upper and lower structural sections under the flight load and the crash load without a metallic extrusion, the at least one embedded beam constructed of the composite panel structure. The method may include, at a step 908, with configuring the at least one of the upper modular rectangular cuboid and the lower modular rectangular cuboid to couple with an aircraft cabin.

CONCLUSION

As will be appreciated from the above description, embodiments of the inventive concepts disclosed herein may provide a novel solution to a composite galley architecture eliminating external corrosion prone metallic extrusions and heavy hardware incorporated within a traditional aircraft galley architecture.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A light weight composite aircraft galley architecture, comprising:
   an upper modular rectangular cuboid, the upper modular rectangular cuboid including an upper structural section, the upper structural section comprising two perpendicular upper contiguous elongated panels of the upper modular rectangular cuboid, the two perpendicular upper contiguous elongated panels constructed of a composite panel structure;
   a lower modular rectangular cuboid, the lower modular rectangular cuboid including a lower structural section, the lower structural section comprising two perpendicular lower contiguous elongated panels of the lower modular rectangular cuboid, the two perpendicular lower contiguous elongated panels constructed of the composite panel structure;
   a lower top panel of the lower structural section configured to join with an upper base panel of the upper structural section;
   the upper structural section and the lower structural section each comprising at least one load bearing peripheral hoop configured for transferring a flight load and a crash load between the upper modular rectangular cuboid and the lower modular rectangular cuboid without a metallic extrusion, the at least one load bearing peripheral hoop constructed of a series of embedded carbon fiber beams surrounding at least one panel of each of the upper structural section and the lower structural section;
   wherein at least one of the upper modular rectangular cuboid and lower modular rectangular cuboid are configured with a molded ductwork, the molded ductwork within the upper modular rectangular cuboid is within the at least one load bearing peripheral hoop;
   the upper structural section and the lower structural section each further comprising at least one embedded carbon fiber beam separate from the at least one load bearing peripheral hoop, the at least one embedded beam configured for maintaining a physical integrity of each of the upper and lower structural sections under the flight load and the crash load without a metallic extrusion.

2. The light weight composite aircraft galley architecture of claim 1, wherein the two perpendicular upper contiguous elongated panels are the upper base panel coupled with an upper back panel.

3. The light weight composite aircraft galley architecture of claim 2, wherein the at least one load bearing peripheral hoop within the upper structural section surrounds the upper back panel and wherein the at least one embedded beam within the upper structural section is embedded within the upper base panel.

4. The light weight composite aircraft galley architecture of claim 1, wherein the two perpendicular lower contiguous elongated panels are a lower back panel coupled with the lower top panel.

5. The light weight composite aircraft galley architecture of claim 4, wherein the at least one load bearing peripheral hoop within the lower structural section surrounds the lower top panel and wherein the at least one embedded beam within the lower structural section is embedded within the lower back panel.

6. The light weight composite aircraft galley architecture of claim 1, wherein the composite panel structure further comprises at least one Spread Tow Fabric (STF) unidirectional carbon fiber pre-pressed carbon panel.

7. The light weight composite aircraft galley architecture of claim 6, wherein the at least one STF unidirectional carbon fiber pre-pressed carbon panel is further configured for a designated strength in at least one of an X direction, a Y direction, and a direction approximately 45 degrees from both of the X direction and the Y direction.

8. The light weight composite aircraft galley architecture of claim 1, wherein the lower modular rectangular cuboid further comprises integrated structural doors without a turn button.

9. The light weight composite aircraft galley architecture of claim 1, wherein each of the upper structural section and the lower structural section further comprises molded U channels configured for receiving at least one side panel associated with one of the upper and lower modular rectangular cuboid.

10. The light weight composite aircraft galley architecture of claim 1, wherein the molded ductwork within the upper modular rectangular cuboid further includes a siamese air port.

11. The light weight composite aircraft galley architecture of claim 1, wherein the molded ductwork within the upper modular rectangular cuboid further includes an air chiller interface port in line with a circumference of the at least one load bearing peripheral hoop.

12. The light weight composite aircraft galley architecture of claim 1, wherein the molded ductwork within the upper modular rectangular cuboid is configured to 1) deliver a conditioned air flow from a source external to the galley architecture to the lower modular rectangular cuboid and 2) channel return air from the lower modular rectangular cuboid to the external source.

13. The light weight composite aircraft galley architecture of claim 1, wherein the molded ductwork within the lower modular rectangular cuboid further includes a lower top air pathway within the lower structural section and a lower back air return pathway proximal with a lower back panel.

14. A method for lightweight composite aircraft galley construction, comprising:
   fabricating a lightweight composite aircraft galley, the lightweight composite aircraft galley comprised of an upper modular rectangular cuboid coupled with a lower modular rectangular cuboid;
   the upper modular rectangular cuboid including an upper structural section, the upper structural section comprising two perpendicular upper contiguous elongated panels, the two perpendicular upper contiguous elongated panels constructed of a composite panel structure;
   the lower modular rectangular cuboid including a lower structural section, the lower structural section comprising two lower perpendicular contiguous elongated panels, the two perpendicular lower contiguous elongated panels constructed of the composite panel structure;
   embedding within each of the upper structural section and the lower structural section at least one load bearing peripheral hoop configured for transferring a flight load and a crash load between the upper modular rectangular cuboid and the lower modular rectangular cuboid without a metallic extrusion, the at least one load bearing peripheral hoop encircles at least one panel of the upper structural section and encircles at least one panel of the lower structural section;
   embedding along at least one edge of each of the upper structural section and the lower structural section at least one embedded carbon fiber beam separate from the at least one load bearing peripheral hoop, the at least one embedded carbon fiber beam configured for maintaining a physical integrity of each of the upper and lower structural sections under the flight load and the crash load without a metallic extrusion, the at least one embedded beam constructed of the composite panel structure; and configuring the upper modular rectangular cuboid and the lower modular rectangular cuboid to couple with an aircraft cabin, wherein configuring the at least one of the upper modular rectangular cuboid and the lower modular rectangular cuboid to couple with an aircraft cabin further comprises configuring a siamese air port within the upper modular rectangular cuboid to couple with an external conditioned air supply.

15. The method for lightweight composite aircraft galley construction of claim 14, wherein fabricating the lightweight composite aircraft galley further comprises configuring the upper modular rectangular cuboid and the lower modular rectangular cuboid to couple with another of the upper modular rectangular cuboid and the lower modular rectangular cuboid.

16. The method for lightweight composite aircraft galley construction of claim 14, wherein fabricating the lightweight composite aircraft galley further comprises assembling a plurality of panels to create each of the upper and lower modular rectangular cuboid, the plurality of panels constructed of a Spread Tow Fabric (STF) unidirectional carbon fiber pre-pressed carbon panel.

17. The method for lightweight composite aircraft galley construction of claim 14, wherein fabricating the lightweight composite aircraft galley further comprises assembling each of the upper and lower modular rectangular cuboids with no structural extrusions.

* * * * *